United States Patent
Buckley et al.

(10) Patent No.: US 8,521,170 B2
(45) Date of Patent: Aug. 27, 2013

(54) SYSTEM AND METHOD FOR ROUTING AN INCOMING CALL TO A PROPER DOMAIN IN A NETWORK ENVIRONMENT INCLUDING IMS

(75) Inventors: Adrian Buckley, Tracy, CA (US); Andrew Allen, Mundelein, IL (US); Michael Shenfield, Richmond Hill (CA)

(73) Assignee: Research In Motion Limited, Waterloo (CA)

(*) Notice: Subject to any disclaimer, the term of this patent is extended or adjusted under 35 U.S.C. 154(b) by 765 days.

(21) Appl. No.: 11/651,251

(22) Filed: Jan. 9, 2007

(65) Prior Publication Data

US 2007/0238467 A1 Oct. 11, 2007

Related U.S. Application Data

(60) Provisional application No. 60/757,697, filed on Jan. 10, 2006, provisional application No. 60/757,809, filed on Jan. 10, 2006.

(51) Int. Cl.
*H04W 40/00* (2009.01)

(52) U.S. Cl.
USPC ........................................ 455/445; 455/552.1

(58) Field of Classification Search
USPC ................. 455/445, 422.1, 560, 435.1, 456.1, 455/456.5, 456.6; 370/328, 329, 330, 331, 370/332
See application file for complete search history.

(56) References Cited

U.S. PATENT DOCUMENTS

| | | | |
|---|---|---|---|
| 6,202,157 B1 | 3/2001 | Brownlie et al. | |
| 7,480,915 B2 | 1/2009 | Costa Requena | |
| 2001/0039576 A1 | 11/2001 | Kanada | |
| 2002/0090932 A1 | 7/2002 | Bhatia et al. | |
| 2002/0196775 A1* | 12/2002 | Tuohino et al. | 370/352 |
| 2003/0009580 A1 | 1/2003 | Chen | |
| 2003/0123438 A1 | 7/2003 | Li et al. | |
| 2003/0129971 A1 | 7/2003 | Gopikanth | |

(Continued)

FOREIGN PATENT DOCUMENTS

| | | |
|---|---|---|
| EP | 0781064 | 6/1997 |
| JP | 2005244463 | 9/2005 |

(Continued)

OTHER PUBLICATIONS

"3GPP TR 23.806 V7.0.0 (Dec. 2005) Technical Report; 3rd Generation Partnership Project; Techinical Specification Group Services and System Aspects; Voice Call Continuity between CS and IMS Study (Release 7)".*

(Continued)

*Primary Examiner* — Wesley Kim
*Assistant Examiner* — Dinh P Nguyen
(74) *Attorney, Agent, or Firm* — The Danamraj Law Group, P.C.

(57) ABSTRACT

In one embodiment, a scheme is disclosed for routing an incoming call in a network environment including a circuit-switched (CS) network and an IP multimedia subsystem (IMS) network, wherein the incoming call is being directed to a user equipment (UE) device disposed in the network environment. A network node disposed in the IMS network is operable to perform a number of determinations with respect to the UE device's domain, state, applicability of user and/or operator policies and preferences, location, et cetera. The incoming call is terminated to an appropriate domain (e.g., CS domain or IMS domain) based at least in part upon the foregoing determinations.

22 Claims, 17 Drawing Sheets

(56) References Cited

U.S. PATENT DOCUMENTS

| | | | |
|---|---|---|---|
| 2003/0157938 A1 | 8/2003 | Haase | |
| 2004/0015569 A1 | 1/2004 | Lonnfors | |
| 2004/0122896 A1 | 6/2004 | Gourraud | |
| 2004/0180646 A1 | 9/2004 | Donley et al. | |
| 2004/0246965 A1 | 12/2004 | Westman et al. | |
| 2005/0041787 A1 | 2/2005 | Casey et al. | |
| 2005/0047412 A1 | 3/2005 | Hares | |
| 2005/0058125 A1 | 3/2005 | Multikainen et al. | |
| 2005/0083904 A1* | 4/2005 | Khartabil et al. | 370/351 |
| 2005/0083955 A1 | 4/2005 | Guichard et al. | |
| 2005/0193150 A1 | 9/2005 | Buckley et al. | |
| 2005/0249152 A1 | 11/2005 | Kiss et al. | |
| 2005/0249196 A1 | 11/2005 | Ansari et al. | |
| 2006/0009232 A1* | 1/2006 | Vakil et al. | 455/453 |
| 2006/0195565 A1 | 8/2006 | De-Poorter | |
| 2006/0209805 A1 | 9/2006 | Mahdi et al. | |
| 2006/0245574 A1* | 11/2006 | Phelps et al. | 379/229 |
| 2006/0294245 A1* | 12/2006 | Raguparan et al. | 709/227 |
| 2007/0036309 A1 | 2/2007 | Zoldi | |
| 2007/0049281 A1 | 3/2007 | Chen | |
| 2007/0060196 A1* | 3/2007 | Sharma | 455/552.1 |
| 2007/0183410 A1 | 8/2007 | Song et al. | |
| 2009/0034511 A1* | 2/2009 | Hundscheidt et al. | 370/352 |
| 2010/0034166 A1 | 2/2010 | Olvera-Hernandez | |

FOREIGN PATENT DOCUMENTS

| | | |
|---|---|---|
| WO | 2001093607 | 12/2001 |
| WO | 03047162 A2 | 6/2003 |
| WO | 2004074967 A2 | 9/2004 |
| WO | 2005039061 A2 | 4/2005 |

OTHER PUBLICATIONS

3rd Generation Partnership Project; Technical Specification Group Services and System Aspects; Voice Call Continuity between CS and IMS Study (Release 7); 3GPP TR 23.806 v7.0.0 (Dec. 2005); 153 pages.
EPO Search Report in EP Application No. 07701658.2; European Patent Office; May 14, 2009; 10 pages.
EPO Search Report in EP Application No. 07701659.0; European Patent Office; May 14, 2009; 8 pages.
EPO Search Report in EP Application No. 07701663.2; European Patent Office; May 14, 2009; 8 pages.
PCT Notification of Transmittal of the International Search Report and the Written Opinion of the International Searching Authority; PCT/CA2007/000027; Apr. 19, 2007; 11 pages.
PCT Notification of Transmittal of the International Search Report and the Written Opinion of the International Searching Authority; PCT/CA2007/000028; Apr. 24, 2007; 10 pages.
PCT Notification of Transmittal of the International Search Report and the Written Opinion of the International Searching Authority; PCT/CA2007/000032; Apr. 24, 2007; 12 pages.
PCT Notification Concerning Transmittal of International Preliminary Report on Patentability; PCT/CA2007/000027; Jul. 24, 2008; 6 pages.
PCT Notification Concerning Transmittal of International Preliminary Report on Patentability; PCT/CA2007/000028; Jul. 24, 2008; 6 pages.
PCT Notification Concerning Transmittal of International Preliminary Report on Patentability; PCT/CA2007/000032; Jul. 24, 2008; 7 pages.
Australian Examiner's Request; Application No. 2007204562; IP Australia; Oct. 9, 2009; 2 pages.
Australian Examiner's Request; Application No. 2007204558; IP Australia; Oct. 8, 2009; 2 pages.
Korean Office Action; Application No. 10-2008-7019007; Korean Intellectual Property Office; Dec. 8, 2009; 4 pages.
CIPO, Office Action, Application No. 2,636,466, Jun. 10, 2011, 6 pgs.
CIPO, Office action, Application No. 2,636,470, Feb. 21, 2011, 3 pgs.
CIPO, Office Action, Application No. 2,636,479, Dec. 6, 2010, 3 pgs.
EPO, Communication Pursuant to Article 94(3) EPC, Application No. 07701658.2, Aug. 12, 2009, 2 pgs.
EPO, Communication Pursuant to Article 94(3) EPC, Application No. 07701659.0, Aug. 12, 2009, 1 pg.
EPO, Communication Pursuant to Article 94(3) EPC, Application No. 07701663.2, Aug. 12, 2009, 1 pg.
IP Australia, Examiner's Report No. 2, Application No. 2007-204558, Oct. 18, 2010, 2 pgs.
IP Australia, Examiner's First Report, Application No. 2007-204559, Sep. 14, 2009, 2 pgs.
JPO, Notice of Reasons for Rejection, Application No. 2008-549725, Feb. 17, 2011, 5 pgs.
JPO, Notice of Reasons for Rejection, Application No. 2008-549726, Mar. 25, 2011, 3 pgs.
KIPO, Notice Requesting Submission of Opinion, Application No. 10-2008-7019006, Jun. 25, 2010, 2 pgs.
KIPO, Notice Requesting Submission of Opinion, Application No. 10-2008-7019007, Dec. 8, 2009, 4 pgs.
KIPO, Notice Requesting Submission of Opinion, Application No. 10-2008-7019011, Apr. 29, 2010, 4 pgs.
IMIP, Office Action, Application No. MX/a/2008/008900, Feb. 18, 2011, 4 pgs.
SIPO, Office Action, Application No. 2007-8008484.2, Sep. 6, 2010, 5 pgs.
USPTO, Office Action, U.S. Appl. No. 11/651,180, Nov. 30, 2009, 6 pgs.
USPTO, Office Action, U.S. Appl. No. 11/651,180, Mar. 18, 2010, 9 pgs.
USPTO, Office Action, U.S. Appl. No. 11/651,348, Oct. 22, 2009, 15 pgs.
USPTO, Office Action, U.S. Appl. No. 11/651,348, Nov. 24, 2010, 11 pgs.
USPTO, Office Action, U.S. Appl. No. 11/651,348, Apr. 12, 2010, 10 pgs.
SIPO, Office Action, Application No. 200780008484.2, Jul. 13, 2011, 7 pgs.
IMPI, Office Action, Application No. MX/a/2008/008900, Oct. 7, 2011, 2 pgs.
CIPO, Office Action, Application No. 2,636,466, Apr. 4, 2012, 8 pgs.
JPO, Office Action, Application No. 2008-549725, Jan. 31, 2012, 4 pgs.
SIPO, Office Action, Application No. 2007-800084842, Feb. 22, 2012, 4 pgs.
CIPO, Office Action, Application No. 2636466, Mar. 14, 2013, 5 pgs.

* cited by examiner

_US 8,521,170 B2_

SYSTEM AND METHOD FOR ROUTING AN INCOMING CALL TO A PROPER DOMAIN IN A NETWORK ENVIRONMENT INCLUDING IMS

PRIORITY UNDER 35 U.S.C. §119(e) & 37 C.F.R. §1.78

This nonprovisional patent application claims priority based upon the following prior U.S. provisional patent application(s): (i) "SYSTEM AND METHOD FOR ROUTING AN INCOMING CALL TO A PROPER DOMAIN IN A NETWORK ENVIRONMENT INCLUDING IMS," Application No. 60/757,697, filed Jan. 10, 2006, in the name(s) of Adrian Buckley and Andrew Allen; and (ii) "NETWORK DOMAIN SELECTION (NeDS) SYSTEM AND METHOD," Application No. 60/757,809, filed Jan. 10, 2006, in the name(s) of Adrian Buckley and Andrew Allen, which is (are) hereby incorporated by reference.

CROSS-REFERENCE TO RELATED APPLICATION(S)

This application discloses subject matter that is related to the subject matter of the following U.S. patent application(s): (i) "DOMAIN SELECTION SYSTEM AND METHOD OPERABLE IN A NETWORK ENVIRONMENT INCLUDING IMS", application Ser. No. 11/651,180, filed Jan. 9, 2007, in the name(s) of Adrian Buckley, Andrew Allen and Michael Shenfield; and (ii) "SYSTEM AND METHOD FOR SELECTING A DOMAIN IN A NETWORK ENVIRONMENT INCLUDING IMS", application Ser. No. 11/651,348, filed Jan. 9, 2007, in the name(s) of Adrian Buckley, Andrew Allen and Michael Shenfield; which is (are) hereby incorporated by reference.

FIELD OF THE DISCLOSURE

The present patent disclosure generally relates to call routing in communications networks. More particularly, and not by way of any limitation, the present patent disclosure is directed to a system and method for managing call routing in a network environment including a circuit-switched (CS) network and an IP multimedia subsystem (IMS) network, wherein an incoming call is to be routed to a proper domain (e.g., CS domain or IMS domain).

BACKGROUND

Mobile voice-over-IP (VoIP) handover is the process of continuing a voice call as a user moves between IP-based networks (e.g., wireless LAN (WLAN) or Wi-MAX networks, $3^{rd}$ Generation Partnership Project (3GPP) Packet-Switched (PS) networks, Long Term Evolution (LTE) networks, etc.) and circuit-switched cellular networks. To effectuate such handover, current $3^{rd}$ Generation Partnership Project (3GPP) standards specify a call continuity control function (CCCF) element that is disposed in a new, IP-based network architecture referred to as the IP multimedia subsystem (IMS). Further, another entity, referred to as a network domain selection (NeDS) function, is defined by the 3GPP standards that interoperates with the CCCF element in order to facilitate proper domain selection with respect to incoming calls directed to a user equipment (UE) device having dual-domain capability. (i.e., CS domain and IMS domain). It is known that several lacunae continue to exist in the current development of NeDS functionality, however.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a scheme for routing an incoming call or session in a network environment including a CS network and an IMS network, wherein the incoming call/session is being directed to a UE device disposed in the network environment. For purposes of the present disclosure and the claims set forth below, the term "call" is to be construed as covering "call" and "session". A network node disposed in the IMS network is operable to perform a number of determinations with respect to the UE device's domain, state, applicability of user and/or operator policies and preferences, location, et cetera. The incoming call is subsequently terminated to an appropriate domain (e.g., CS domain or PS domain) based at least in part upon the foregoing determinations.

In one aspect, a method is disclosed for routing an incoming call in a network environment including a CS network and an IMS network, wherein the incoming call is being directed to a UE device disposed in the network environment. The claimed method comprises: determining status information relating to the UE device; determining whether at least one policy criterion is applicable with respect to the incoming call; and terminating the incoming call to a domain based on at least one of the determinations, wherein the determinations are effectuated at a network node associated with the IMS network.

In another aspect, disclosed herein is a system for routing an incoming call in a network environment including a CS network and an IMS network, the incoming call being directed to a UE device disposed in the network environment, the system comprising: means for determining status information relating to the UE device; means for determining whether at least one policy criterion is applicable with respect to the incoming call; and means for terminating the incoming call to a domain based on at least one of the determinations, wherein the determinations are effectuated at a network node associated with the IMS network.

In yet another aspect, disclosed herein is a network node operable to be disposed in an IMS network, the network node comprising: an interface for communicating with a UE device operable to support an IMS service; an interface for communicating with a home subscriber server (HSS) element associated with the UE device; and at least one interface for communicating with one of a presentity presence proxy element, a presence network agent, a wireless access network hotspot database, and a policy decision function element.

Figure 1:
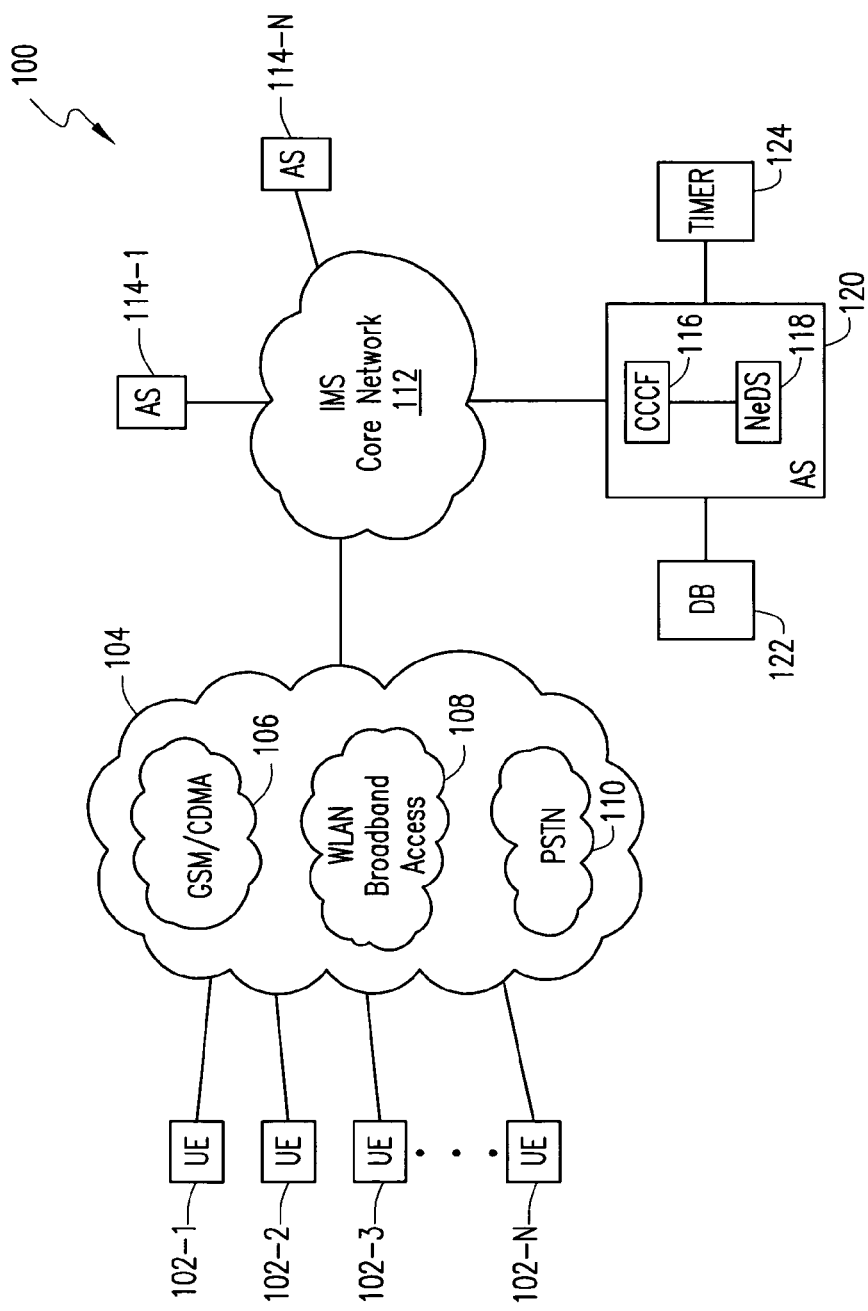
FIG. 1 depicts a network environment including circuit-switched (CS) network infrastructure and IP multimedia subsystem (IMS) infrastructure wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary network environment 100 is depicted wherein an embodiment of the present patent disclosure may be practiced for effectuating call routing with respect to an incoming call to a proper domain (e.g., CS domain or IMS domain). As depicted, the network environment 100 includes an access space 104 comprised of a number of access technologies available to a plurality of UE devices 102-1 through 102-N. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. Preferably, the UE device is capable of operating in multiple modes in that it can engage in both circuit-switched (CS) as well as packet-switched (PS) communications, and can transition from one mode of communications to another mode of communications without loss of continuity.

The access space 104 may be comprised of both CS and PS networks, which may involve wireless technologies, wireline technologies, broadband access technologies, etc. For example, reference numeral 106 refers to wireless technologies such as Global System for Mobile Communications (GSM) networks and Code Division Multiple Access (CDMA) networks, although it is envisaged that the teachings hereof may be extended to any $3^{rd}$ Generation Partnership Project (3GPP)-compliant cellular network (e.g., 3GPP or 3GPP2) as well. Reference numeral 108 refers to broadband access networks including wireless local area networks or WLANs, Wi-MAX networks as well as fixed networks such as DSL, cable broadband, etc. Also exemplified as part of the access space 104 is the conventional wireline PSTN infrastructure 110.

An IP multimedia subsystem (IMS) core network 112 is coupled to the various access networks set forth above, including any CS-based networks. As is well known, the IMS standard defined by the 3GPP is designed to allow service providers manage a variety of services that can be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" to be the network element that delivers services subscribers use, e.g., voice call continuity (VCC), Push-To-Talk (PTT), etc. IMS manages applications by defining common control components that each application server (AS) is required to have, e.g., subscriber profiles, IMS mobility, network access, authentication, service authorization, charging and billing, inter-operator functions, and inter-operation with the legacy phone network.

It should be understood that whereas IMS is defined by the 3GPP standards body which mainly addresses GSM networks, another group, 3GPP2, is involved in defining a closely analogous architecture referred to as Multimedia Domain (MMD). MMD is essentially an IMS for CDMA networks, and since MMD and IMS are roughly equivalent, the term "IMS" may be used in this present patent disclosure to refer collectively to both IMS and MMD where applicable.

Continuing to refer to FIG. 1, reference numerals 114-1 to 114-N refer to a plurality of AS nodes operable to support various IMS services, e.g., VCC, PTT, etc., as alluded to hereinabove. Furthermore, in order to effectuate call continuity and appropriate domain selection, another network node or AS 120 may be provided as part of the subscribers' home IMS core network 112 which implements functionality referred to as call continuity control function (CCCF) 116 and network domain selection (NeDS) 118. In essence, the CCCF portion 116 of AS 120 is operable as a new IMS application server element that resides in the home IMS network and tracks all call sessions and related mobile voice-over-IP (VoIP) bearer traffic, including call handover/routing between CS and IMS domains. As will be described in greater detail hereinbelow, the NeDS portion 118 of AS 116 is responsible for performing, inter alia, registration/de-registration management between the IMS and CS networks (e.g., GSM or CDMA) as well as domain selection for routing incoming calls. Although potentially separate functions, it is possible to integrate both the CCCF and NeDS functionalities into a single IMS-compatible network element 120 as illustrated in FIG. 1. Additionally, appropriate database structures (e.g., DB 122) and timer mechanisms (e.g., timer 124) may be provided in association with AS 120 for purposes that will be described in greater detail below with respect to the NeDS functionality which may be distributed (e.g., among two or more components) or integrated into a single network element. Because of the high degree of flexibility in implementation, those skilled in the art should recognize that the term "NeDS element" as used hereinbelow is generally treated as being synonymous with "network node" having the domain selection functionality, which in turn may be comprised of a single platform or a number of platforms. For example, the network node may include functionalities such as Domain Transfer Function (DTF) (also referred to as Functional Entity FE-A), CS Adaptation Function (CSAF) (also referred to as FE-B), CAMEL Service (also referred to as FE-C), and Domain Selection Function (DSF) (also referred to as FE-D), which have been specified in the 3GPP TS 23.206 documentation.

Figure 2:
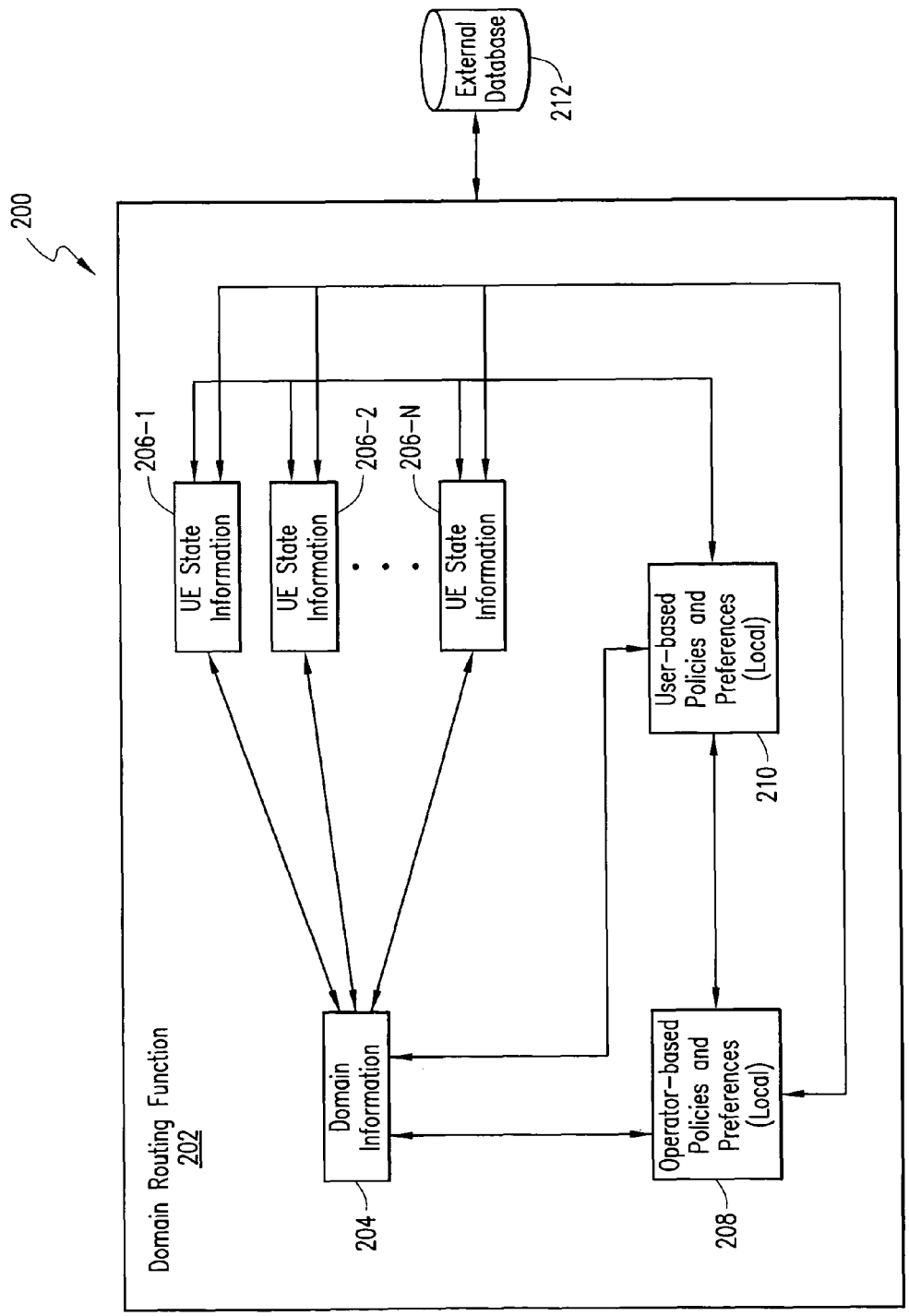
FIG. 2 depicts an embodiment of a network element operable to effectuate domain selection for purposes of the present patent disclosure.

FIG. 2 depicts an embodiment of a network element 200 for purposes of the present patent application. Those skilled in the art should recognize that embodiment 200 may be operable in conjunction with a CCCF element as set forth above in reference to FIG. 1, although it is not a necessary requirement. Further, as set forth above, the functionality of the network element/node may be distributed among a number of different functions specified in TS 23.206. As illustrated herein, the NeDS element or node 200 includes a representation of a domain routing function 202 that is responsible for terminating an incoming call, depending on whether the call is IMS-originated, CS-originated, status of the UE device, etc., as well as any applicable user- and operator-based policies and preferences. Appropriate software/firmware structure or logic 204 is therefore provided as part of the NeDS element 200 for maintaining information regarding which domain or domains a UE device is in. With respect to each domain that the UE device is in, one or more state engines are provided for monitoring the status information of the UE device which may be treated as comprising a plurality of "states" having well-defined transitions. Preferably, the state transitions may be effectuated based on rules, policies, preferences, as well as updated information provided by the UE device. Accordingly, the state transition models are operable to provide an accurate representation of the UE device to the domain routing function 202 for facilitating appropriate domain selection with respect to an incoming call. By way of illustration, reference numerals 206-1 through 206-N refer to a plurality of UE state transition models or engines maintained by the NeDS element 200 that may be selectively applied based on the domain information of the UE device.

In accordance with an embodiment of the present patent disclosure, the IMS network node having the NeDS capability 200 may be provided with appropriate internal databases 208 and 210 for locally maintaining various user- and/or operator-based policies and preferences, that may be updated periodically, or otherwise, via applicable over-the-air (OTA) mechanisms. Alternatively or additionally, an external database 212 may be interfaced with the NeDS element 200 such that the domain routing function 202 can interrogate the database for applicable rules, policies and preferences based on determinations relating to which domain(s) and state(s) the UE device is in. Accordingly, it should be realized that the overall NeDS functionality may preferably include appropriate logic structure/software/firmware module(s) for applying one or more filters with respect to terminating a call, wherein the filters are operable to perform a number of determinations based on current domain of a UE device, device state, presence information, applicable policies or preferences, or other criteria (collectively "status information"). At a higher level of abstraction, the overall service logic is therefore operable to perform the following: (a) determining whether an IMS service (e.g., VCC) should be invoked; and (b) routing the incoming call to the correct domain. The first part of the functionality may be modulated based on whether the UE device is IMS service-capable; location of the UE device; and the network(s) the UE device is registered on or attached with. Likewise, the second part of the NeDS functionality may be modulated based on which domains the UE is registered with; state(s) the UE device is in with respect to the domain(s) it is registered with; operator-based preferences; and user-based preferences. In the following sections of the present disclosure, an embodiment of the overall NeDS architecture will be presented that is designed to effectuate the various components of the NeDS functionality set forth above.

Figure 3:
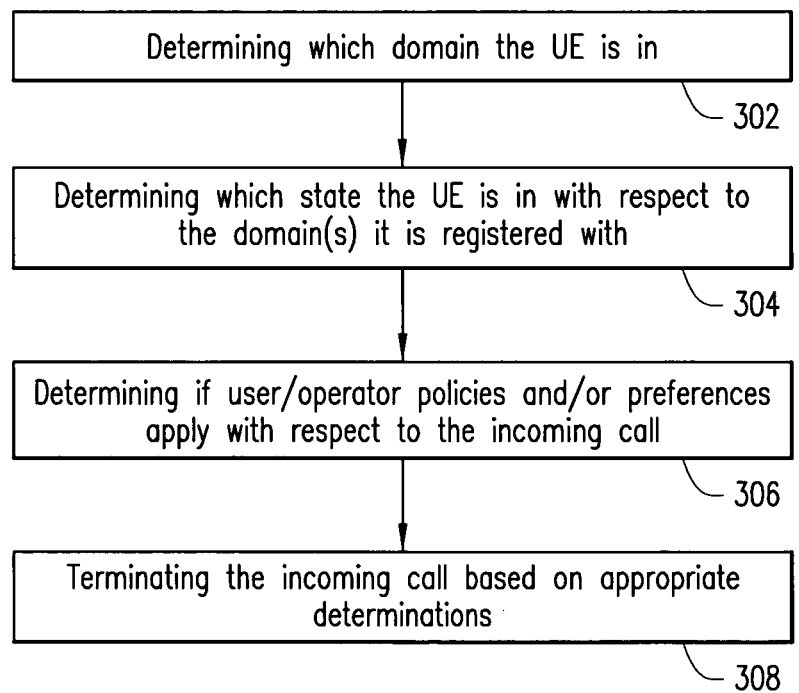
FIG. 3 depicts a flowchart of an embodiment of the present patent disclosure for routing an incoming call.

Referring now to FIG. 3, depicted therein is a flowchart of an embodiment of the present patent disclosure for routing an incoming call. As alluded to before, a determination is initially made at the serving NeDS node whether IMS-based services are to be invoked and/or if the UE device to which the incoming call is directed is capable of IMS services. Once these conditions have been satisfied, a series of determinations may be made by the domain routing function of the NeDS element to facilitate call routing. A determination may be made as to which domain(s) the UE device is in (block 302). Another determination involves identifying which state (s) the UE device is in with respect to its domains (block 304). Yet another determination involves applicability of user/operator policies and preferences with respect to the incoming call (block 306). The incoming call is then terminated by the NeDS network node to the appropriate domain/functionality based on the foregoing determinations (block 308).

Figure 4:
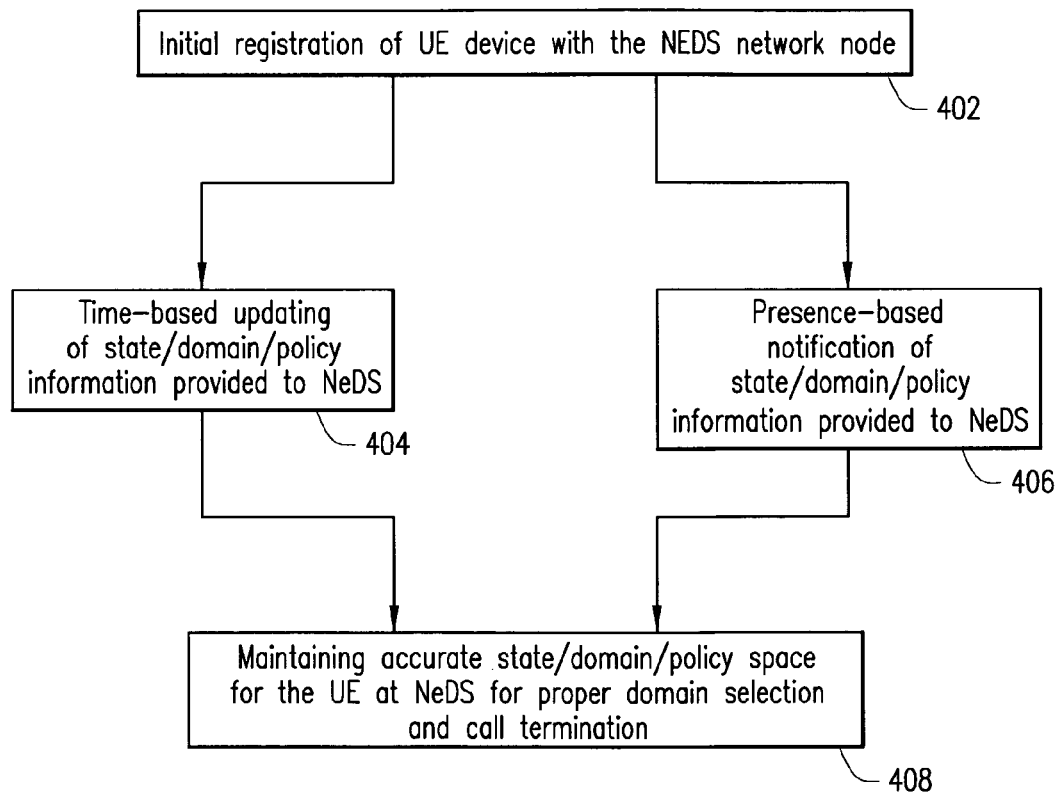
FIG. 4 depicts a flowchart relating to a model of overall interaction between a UE device and associated NeDS element in accordance with an embodiment.

FIG. 4 depicts a flowchart relating to a model of interaction between a UE device and associated NeDS element in accordance with an embodiment. As illustrated, the UE device is operable to initially register with its NeDS network node using either CS signaling or IMS signaling (block 402). The UE device may subsequently provide updates of its state(s), domain(s), and policies/preferences to the NeDS node in some periodic manner, e.g., based on applicable timer mechanisms (block 404). Alternatively or additionally, the NeDS node may subscribe to a presence agent associated with the UE device via suitable presence-based interfacing, which allows it to receive notifications of any changes in the UE device's state(s), domain(s) and policies/preferences (block 406). Based on the updated information, the NeDS network node maintains an accurate state/domain/policy space for the UE device in order to effectuate domain selection and call termination (block 408).

Figure 5:
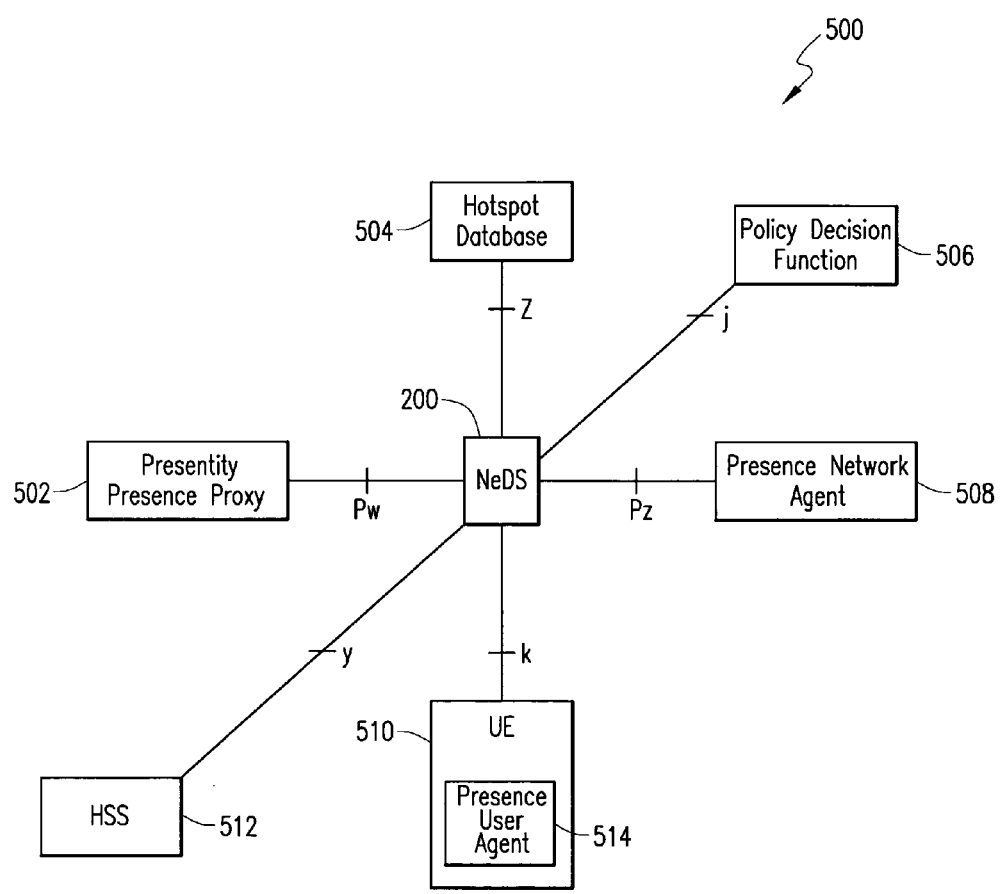
FIG. 5 depicts a functional block diagram that illustrates a plurality of interfaces provided with a NeDS element in accordance with an embodiment.

FIG. 5 depicts a functional block diagram that illustrates a plurality of interfaces provided with a NeDS element, e.g., NeDS 200, in accordance with an embodiment. As illustrated, NeDS 200 is preferably operable with a number of functional/logical entities via well-defined interfaces that may be referred to as reference points. A "Pz" reference point identifies the need for a communication path and thus some suitable interface(s) between NeDS 200 and a presence network agent 508, which allows NeDS 200 to report mobility management events to the presence network agent 508. With respect to the IP-based domain (i.e., PS domain), the events may comprise but not limited to: attach, not reachable for paging, detach, routing area (RA) update, and the like. As to the CS domain, the events likewise comprise but not limited to: attach, detach, location area (LA) update, and so on. In a further variation, the Pz reference point may allow NeDS 200 to report call-related events such as call setup with bearer information and call release. Additionally, the Pz reference point may also allow NeDS 200 to report mobility states, e.g., detached, idle, connected, etc., as well as session states such as active or inactive PDP contexts. In terms of implementation, an exemplary embodiment of the Pz reference point may involve an interface compliant with 3GPP-based Customized Applications for Mobile Enhanced Logic (CAMEL) messaging.

A "Pw" reference point identifies the need for a communication path and thus some suitable interface(s) between NeDS 200 and a presentity presence proxy 502, e.g., as defined in 3GPP TS 23.141. The presentity presence proxy 502 is operable as a functional entity that provides presentity related functionality such as determining the presence server associated with a presentity. A wireless access network hotspot database 504 (e.g., hotspots for WLANs, Wi-MAX networks, and so on) may be interfaced with NeDS 200 via a "z" reference point which allows the domain routing functionality of NeDS to determine if an IMS service (e.g., VCC) can and/or should be performed at the wireless access network with which the UE is currently registered. Such a determination may be effectuated by determining the location of the UE based on Global Positioning System (GPS) information, Cell Global Identification (CGI) information, or some other user input waypoint such as airport code, city name, landmark, etc. A policy decision function 506 is interfaced with NeDS 200 via a "j" reference point which allows NeDS 200 to obtain operator policy/preferences information for routing a call. As to user policies/preferences, they may be stored in another network element called home subscriber server (HSS), e.g., HSS 512, that is interfaced with NeDS 200 via a "y" reference point. If the user policy information is not stored in HSS 512, the j reference point may be used by the NeDS functionality to obtain appropriate user policy information from an external database.

Continuing to refer to FIG. 5, the interface between NeDS 200 and a UE device 510 is defined by a "k" reference point, wherein the UE device may also include a presence user agent 514 to which NeDS may subscribe for receiving presence-based status notifications. This interface allows NeDS to be aware of state of the UE device in each domain (e.g., attached, detached, etc.); state of any connections (e.g., PDP activated, ongoing call, when the call is set up, when the call is torn down, etc.); and location information with respect to the UE device. Additionally, this interface also allows users to activate, deactivate, interrogate and/or modify their IMS service settings at the NeDS node. As alluded to previously, HSS 512 may be interfaced with NeDS 200 via the y reference, which allows the NeDS to: (i) activate an IMS service (e.g., VCC) by turning appropriate CAMEL triggers on; (ii) deactivate an IMS service by turning CAMEL triggers off; and (iii) obtain user policy information for routing a call.

Figure 6A:
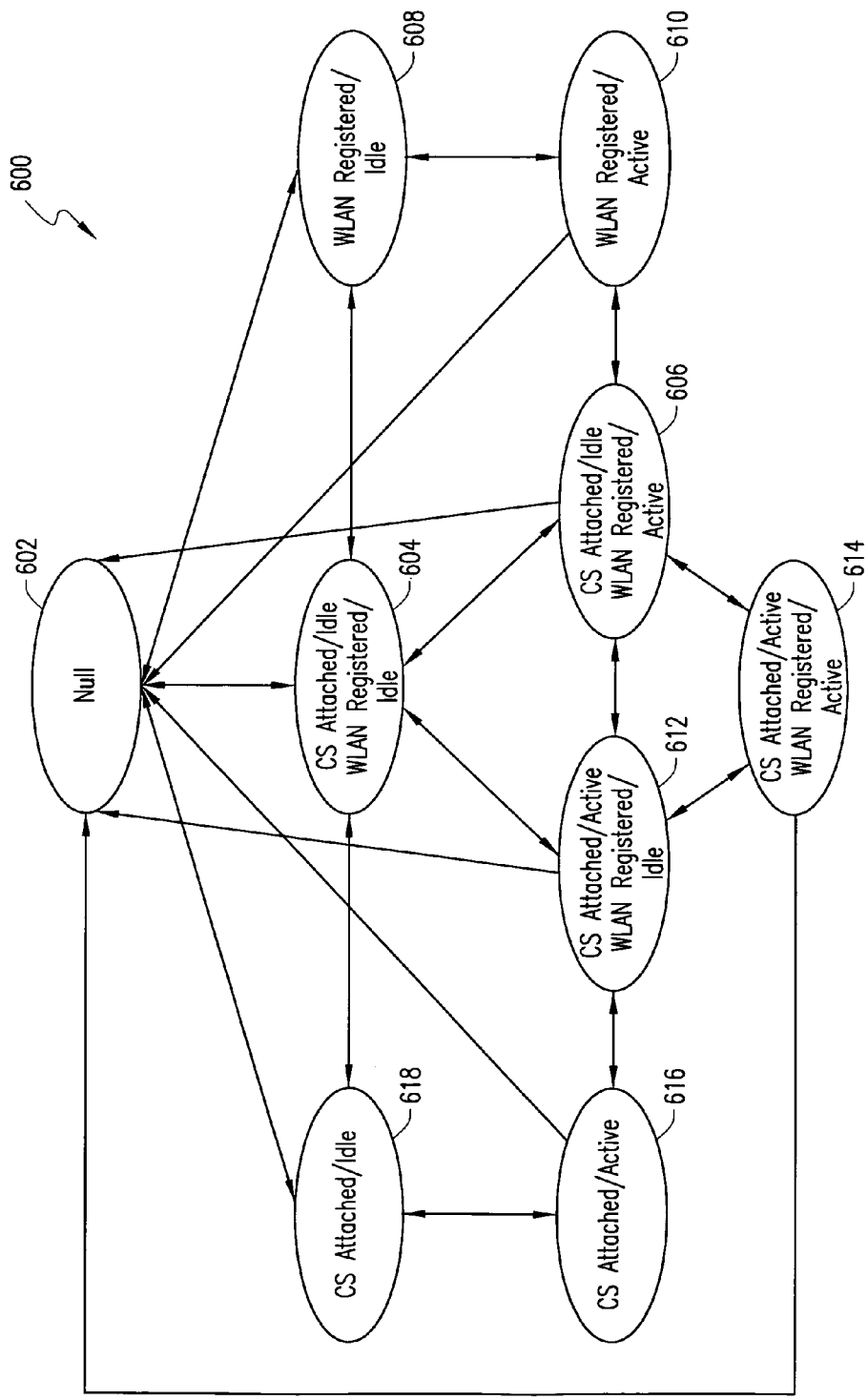
FIG. 6A depicts an embodiment of a state transition engine provided with a NeDS element that maintains state transitions for a UE device.

FIG. 6A depicts an embodiment of a state transition engine 600 provided with a network node, e.g., NeDS 200, that maintains appropriate state transitions for a UE device. Essentially, the various states illustrated in FIG. 6A define a plurality of status conditions in which the UE device can be and allowable transitions therebetween. Starting from an initial Null state 602, the UE device may transition to state 618 which defines that the UE is attached to the CS domain and is able to originate and terminate calls. State 616 defines that the UE device continues to be attached to the CS domain and is active in a call. State 612 defines that the UE device is attached to the CS domain and is registered in the IMS domain via, e.g., a WLAN, Wi-MAX, LTE, etc. Further, the UE device is active in a call in the CS domain and is only able to originate and terminate calls in this domain. State 606 defines that the UE device is attached to the CS domain and is registered in the IMS domain. The UE device is active in a call in the IMS domain and is only able to originate and terminate calls in the IMS domain. Analogous to state 618, state 608 defines that the UE device is registered in the IMS domain via, e.g., a WLAN, Wi-MAX, LTE, etc., and is able to originate and terminate calls. State 610 defines that the UE device is registered in the IMS domain via, e.g., a WLAN, and is active in a call. State 604 defines that the UE device is attached to the CS domain and also registered in the IMS domain, but it is idle in both domains. State 614 defines that the UE device is attached to the CS domain and is registered in the IMS domain, and is active in both domains. This transition state exists when an inter-domain IMS service, e.g., VCC, is actually being performed and may be present for a finite time.

Although FIG. 6A does not explicitly illustrate any sub-states, it is envisaged that certain IMS-based states may have one or more such sub-states depending on actual implementation. In one exemplary embodiment, such sub-states may be known from the UE device itself. For instance, there may be a sub-state which defines that the UE device is associated with, for example, a WLAN, Wi-MAX or LTE network, but does not have a local IP address yet. Once a local IP address is assigned to the UE device, it may transition into another sub-state that defines this condition, although the device has not registered with the IMS network yet. Such a state may exist when some type of authorization is required of the UE device before it can use the WLAN to reach the IMS core.

Those skilled in the art should recognize that although reference is taken with respect to a WLAN in the state transition engine/model 600 of FIG. 6A, state transitions regarding other IP-based wireless networks may also be included. Accordingly, the term "IMS states" may comprehend states with respect to both WLANs as well as other IP-based wireless access networks for purposes of the present patent disclosure.

Figure 6B:
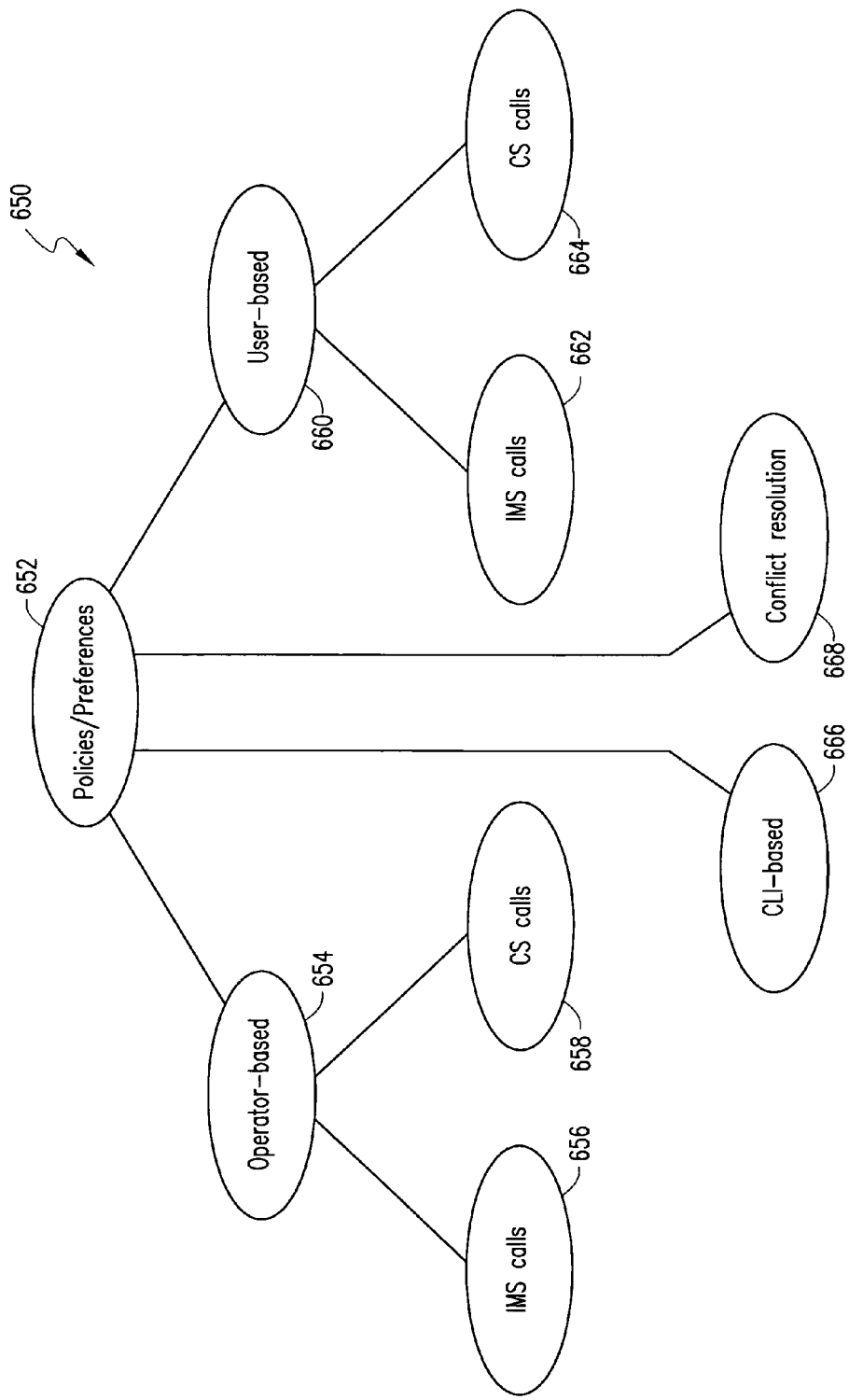
FIG. 6B depicts a policy/preferences schema for purposes of the present patent disclosure.

As pointed out previously, various policies/preferences, e.g., operator-based policies and preferences, user-based policies and preferences, and any combination thereof (collectively, "policy criteria"), may be provided to modulate the domain selection process of the NeDS functionality in accordance with the embodiments set forth herein. FIG. 6B illustrates a policy schema 650 that may be embodied as a database structure, either network-based or device-based, for purposes of the present disclosure, wherein reference numeral 652 refers to the entire policy space applicable with respect to a UE. Exemplary operator-based policies 654 may be grouped into two categories: (i) policies affecting IMS call delivery 656 (i.e., termination of an incoming call originated in the IMS domain); and (ii) policies affecting CS call delivery 658 (i.e., termination of an incoming call originated in the CS domain). Likewise, user-based policies 660 may also be categorized in a similar fashion into IMS call delivery policies 662 and CS call delivery policies 664.

Operator-based IMS call delivery policies 656 may comprise the following examples:
When the UE device is CS-registered, IMS calls/sessions are delivered to the CS side even if the device is IMS-registered.
When the UE device is CS-registered, IMS calls/sessions are delivered to the IMS side even if the device is CS-registered, irrespective of any Quality of Service (QoS) considerations.

When the UE device is CS-registered, IMS calls/sessions are delivered to the IMS side, for a given minimum QoS, even if the device is CS-registered.

When the UE device is CS-registered, IMS calls/sessions are not delivered to the CS side when IMS is not available.

No policy is specified.

Likewise, operator-based CS call delivery policies 658 may comprise the following examples:

When the UE device is IMS-registered, CS calls/sessions are delivered to the IMS side even if the device is CS-registered.

When the UE device is IMS-registered, CS calls/sessions are delivered to the IMS side for a given minimum QoS, even if the device is CS-registered.

When the UE device is IMS-registered, CS calls/sessions are delivered to the CS side even if the device is IMS-registered.

When the UE device is CS-registered, CS calls/sessions are not delivered to the IMS side when CS is not available.

No policy is specified.

Similarly, user-based IMS call delivery policies 662 may comprise the following examples:

When the UE device is CS-registered, IMS calls/sessions are delivered to the CS side even if the device is IMS-registered.

When the UE device is CS-registered, IMS calls/sessions are delivered to the IMS side even if the device is CS-registered, irrespective of any Quality of Service (QoS) considerations.

When the UE device is CS-registered, IMS calls/sessions are delivered to the IMS side, for a given minimum QoS, even if the device is CS-registered.

When the UE device is CS-registered, IMS calls/sessions are not delivered to the CS side when IMS is not available.

No policy is specified.

Additionally, user-based CS call delivery policies 664 may comprise the following examples:

When the UE device is IMS-registered, CS calls/sessions are delivered to the IMS side even if the device is CS-registered.

When the UE device is IMS-registered, CS calls/sessions are delivered to the IMS side for a given minimum QoS, even if the device is CS-registered.

When the UE device is IMS-registered, CS calls/sessions are delivered to the CS side even if the device is IMS-registered.

When the UE device is CS-registered, CS calls/sessions are not delivered to the IMS side when CS is not available.

No policy is specified.

Furthermore, additional policies or routing rules 666 may be implemented based on calling line identity (CLI) data, wherein one or more ranges of E.164 calling party numbers may be defined for a particular routing treatment. A range may comprise a list of any arbitrary size, I, wherein I=1, 2, . . . , N. For each range defined, exemplary policies can include if the incoming call is to be delivered to: (i) IMS side only; (ii) CS side only; (iii) terminate to IMS side first and if unsuccessful, then terminate to CS side; (iv) terminate to CS side first and if unsuccessful, then terminate to IMS side; (v) no preferential treatment; and so on.

The exemplary policy/preferences scheme 650 may also include a conflict resolution mechanism 668 wherein appropriate rules or priorities are implemented in case of a possible conflict. As between user-based policies and operator-based policies, the following options may be implemented: (i) user policy always takes precedence; (ii) operator policy always takes precedence; (iii) when no user policy exists, operator policy shall be used; and (iv) when no operator policy exists, user policy shall be used. In addition, a rule may be provided that CLI-based routing policies 666 take precedence over IMS and CS call delivery policies, regardless of whether they are user-based or operator-based.

As described previously, the various policies and preferences 652 may be stored locally in the NeDS element or may be provisioned in an external database that is accessible to the NeDS element via appropriate interfacing. Additionally, the user policies and preferences as well as other related information may be stored in a removable module such as a Universal Integrated Circuit Card (UICC), Universal Subscriber Identity Module (USIM), Removable User Identity Module (RUIM), Compact Flash, Secure Digital (SD) memory card, etc. that may be provided as part of the UE device. Further, a subscriber may operate the UE device to effectuate appropriate user policy settings at the NeDS element using applicable CS-based or IMS-based messaging.

Figure 7:
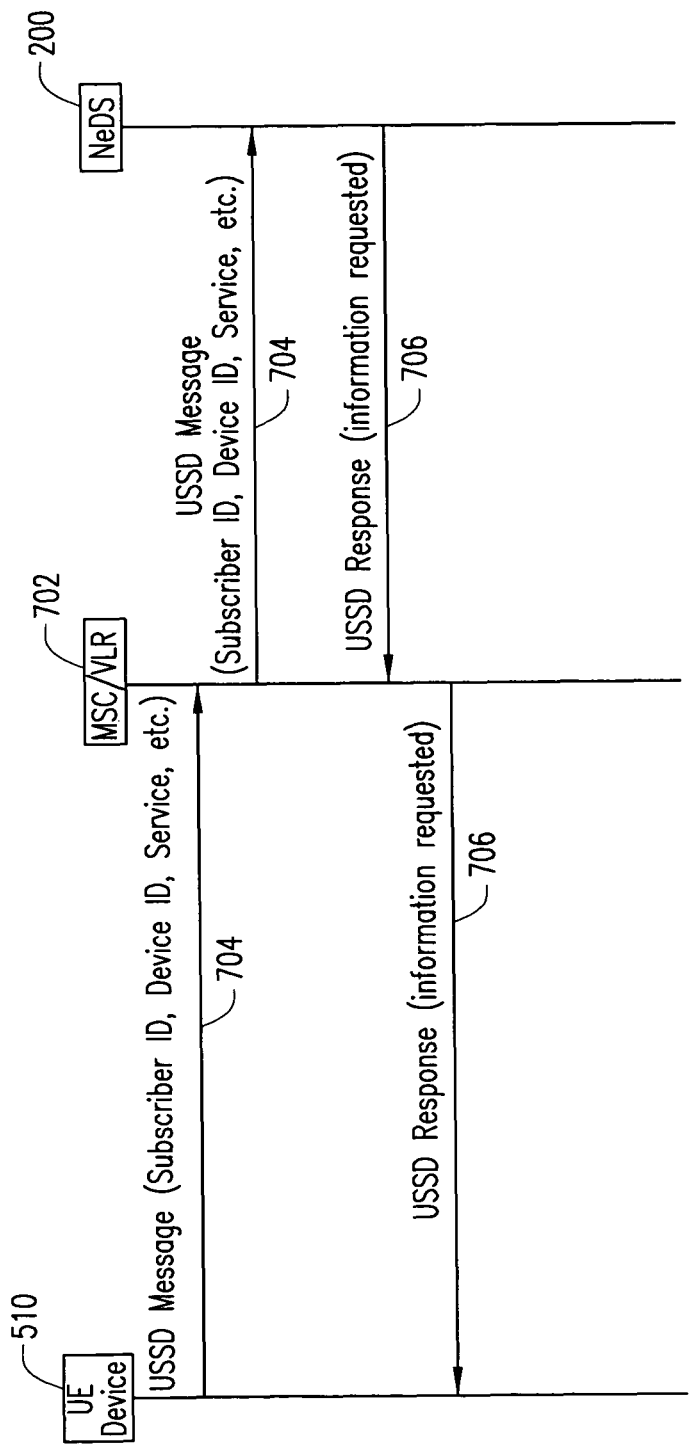
FIG. 7 depicts a message flow diagram for effectuating user policy/preference settings at a NeDS element in accordance with an embodiment of the present disclosure.

FIG. 7 depicts a message flow diagram for effectuating user policy/preference settings at a NeDS element, e.g., NeDS 200, in accordance with an embodiment of the present disclosure. As will be seen below, although the message flow diagrams of the present disclosure may be illustrated with known elements such as mobile switching centers (MSC), visitor location registers (VLR), and home subscriber servers (HSS), they could be generalized as network nodes having specific functionalities such as, e.g., an MSC/VLR entity may perform call control, service control and media switching. Accordingly, it should be apparent that regardless of the particular implementations set forth herein, the exemplary functionalities may also be effectuated by separate platforms. As illustrated in FIG. 7, a USSD message 704 may be generated by the UE device 510 in the CS domain to activate, interrogate, deactivate, or modify the user policies and preferences at NeDS 200. Typically, the message flow may be mediated via network elements such as a mobile switching center (MSC) and associated visitor location register (VLR), collectively referred to as node 702, disposed between the UE device and its home IMS NeDS node 200. A response USSD message 706 is propagated via MSC/VLR 702 from NeDS 200 to the UE device 510 with appropriate information as requested.

Alternatively, the message flow for effectuating user policy/preference settings at NeDS 200 may be implemented in the IMS domain using other messaging protocols such as Extensible Markup Language (XML) Configuration Access Protocol (XCAP) messaging or SIP Publish messaging. Regardless of whether CS-based or IMS-based messaging is used, the UE device 510 is operable to include one or more of the following information elements: subscriber identity (e.g., Private User Identity such as International Mobile Subscriber Identity or IMSI, Mobile Identification Number or MIN, Network Access Identifier or NAI, etc.); equipment identity or Instance Identifier (e.g., International Mobile Equipment Identity or IMEI or IMEISV, Electronic Serial Number or ESN, Personal Identification Number of PIN, Media Access Control or MAC address, etc.); Globally Routable User Agent URI or GRUU, which can be a combination of IMSI and IMEI; policy information; and action(s) to be taken (e.g., activate, deactivate, modify, interrogate, and the like). For example, the user may be able to activate an IMS service (e.g., VCC), and thereafter, a number of user policies may be set with respect to IMS calls and/or CS calls, such as those described above. Likewise, the user may also be able to deactivate an IMS service via proper messaging in CS or IMS domain. When interrogated by the user, the response message from NeDS 200 may indicate that the interrogated IMS service is deactivated, or if active, applicable policies/preferences may be included. Using the modify option, the user may be able to alter one or more applicable user policies and preferences with respect to the IMS service included in the query.

By way of example, set forth below is a table with XML messaging to effectuate policies/preferences at the NeDS network node.

TABLE I

```
<?xml version="1.0" encoding="UTF-8" standalone="no"?>
<!--W3C Schema generated by XMLSpy v2006 sp2 U
(http://www.altova.com)-->
<!--Please add namespace attributes, a targetNamespace
attribute and import elements according to your
requirements-->
<xs:schema xmlns:xs="http://www.w3.org/2001/XMLSchema"
elementFormDefault="qualified">
    <xs:import
namespace="http://www.w3.org/XML/1998/namespace"/>
        <xs:element name="vccmessage">
            <xs:complexType>
                <xs:sequence>
                    <xs:element ref="operation"/>
                </xs:sequence>
                <xs:attribute name="subscriberID"
use="required" type="xs:string"/>
                <xs:attribute name="terminalID"
use="required" type="xs:string"/>
            </xs:complexType>
        </xs:element>
        <xs:element name="operation">
            <xs:complexType>
                <xs:sequence>
                    <xs:element ref="delivery"
minOccurs="0" maxOccurs="unbounded"/>
                </xs:sequence>
                <xs:attribute name="action"
default="activate">
                    <xs:simpleType>
                        <xs:restriction base="xs:NMTOKEN">
                            <xs:enumeration
value="deactivate"/>
                            <xs:enumeration
value="modify"/>
                            <xs:enumeration
value="activate"/>
                            <xs:enumeration
value="interrogate"/>
                        </xs:restriction>
                    </xs:simpleType>
                </xs:attribute>
            </xs:complexType>
        </xs:element>
        <xs:element name="delivery">
            <xs:complexType>
                <xs:sequence>
                    <xs:element ref="policy"
maxOccurs="unbounded"/>
                </xs:sequence>
                <xs:attribute name="type" default="none">
                    <xs:simpleType>
                        <xs:restriction base="xs:NMTOKEN">
                            <xs:enumeration value="all"/>
                            <xs:enumeration
value="none"/>
                            <xs:enumeration value="IMS"/>
                            <xs:enumeration value="CS"/>
                        </xs:restriction>
                    </xs:simpleType>
                </xs:attribute>
            </xs:complexType>
        </xs:element>
        <xs:element name="policy">
            <xs:complexType>
                <xs:complexContent>
```

TABLE I-continued

```
                    <xs:restriction base="xs:anyType">
                        <xs:attribute name="name"
default="none">
                            <xs:simpleType>
                                <xs:restriction
base="xs:NMTOKEN">
                                    <xs:enumeration
value="none"/>
                                    <xs:enumeration
value="P0"/>
                                    <xs:enumeration
value="P1"/>
                                    <xs:enumeration
value="P2"/>
                                    <xs:enumeration
value="P3"/>
                                </xs:restriction>
                            </xs:simpleType>
                        </xs:attribute>
                    </xs:restriction>
                </xs:complexContent>
            </xs:complexType>
        </xs:element>
</xs:schema>
```

Another example of policy activation in XML is provided below in Table II.

TABLE II

```
<?xml version="1.0" encoding="UTF-8" ?>
-<!--
    sample VCC message for subscriberID 00001234 and terminalID
    1A2B3C4D
    -->
-<!--
    operation: Activate
    -->
-<!--
    delivery type: CS
    -->
-<!--
    policy: When CS registered IMS calls are delivered to IMS
    side even if CS registered.
    -->
-<!--
    delivery type: IMS
    -->
-<!--
    policy: When IMS registered CS calls are delivered to IMS
    side even if CS registered irrespective of any QoS.
    -->
<vccmessage xmlns:xsi="http://www.w3.org/2001/XMLSchema-
    instance"
    xsi:noNamespaceSchemaLocation="vccmessage.xsd"
    subscriberID="00001234" terminalID="1A2B3C4D">
<operation action="activate">
<delivery type="CS">
<policy name="P2" />
    </delivery>
<delivery type="IMS">
<policy name="P0" />
    </delivery>
    </operation>
    </vccmessage>
-<!--
    policy codes:
    -->
-<!--
    P0 - When Domain A registered Domain B calls are delivered
    to Domain A even if Domain B registered irrespective
    of any QoS:
    -->
-<!--
    P1 - When Domain A registered Domain B calls are delivered
    to Domain A side even if Domain B registered for a
    given minimum QoS
    -->
```

TABLE II-continued

```
- <!--
    P2 - When Domain A registered Domain B calls are delivered
         to Domain B side even if Domain A registered
    -->
- <!--
    P3 - When Domain A registered Domain B calls are not
         delivered to the Domain A side when Domain B is not
         available
    -->
- <!--
    Note: Domain is defined by the type attribute of delivery
          element. Domains A and B are mutually exclusive i.e.
          if A = IMS then B = CS and vice versa
    -->
```

Various exemplary coding structures may be utilized in the message flow set forth above for effectuating user policy/preference settings at NeDS 200. By way of exemplary implementation, it should be appreciated that both 8-bit and 4-bit binary coding may be used within XML-based syntax whose general structure is illustrated below:

```
Operation to Perform
    Length
        Delivery Option (None, CS, IMS)
        Length
            Policy (1 to N)
        Delivery Option (None, CS, IMS)
        Length
            Policy (1 to N)
    . . .
```

The following tables illustrate 8-bit binary coding structures with respect to operations and delivery options:

TABLE III

| Operation to Perform | |
|---|---|
| 00000000 | Activate |
| 00000001 | Deactivate |
| 00000010 | Interrogate |
| 00000011 | Modify |

TABLE IV

| Delivery Options | |
|---|---|
| 00000000 | None Specified |
| 00000001 | All |
| 00000010 | CS |
| 00000011 | IMS |

TABLE V

| Policy | |
|---|---|
| 00000000 | When Domain A, Domain B Calls are delivered to Domain A even if Domain B registered irrespective of any QoS |
| 00000001 | When Domain A Registered Domain Calls are delivered to Domain A side even if Domain B registered for a given minimum QoS |
| 00000010 | When Domain A registered Domain B calls are delivered to Domain B side even if Domain A registered |
| 00000011 | When Domain A registered Domain B calls are not delivered to the Domain A side when Domain B is not available |
| 00000100 | No Policy given |

Figure 8:
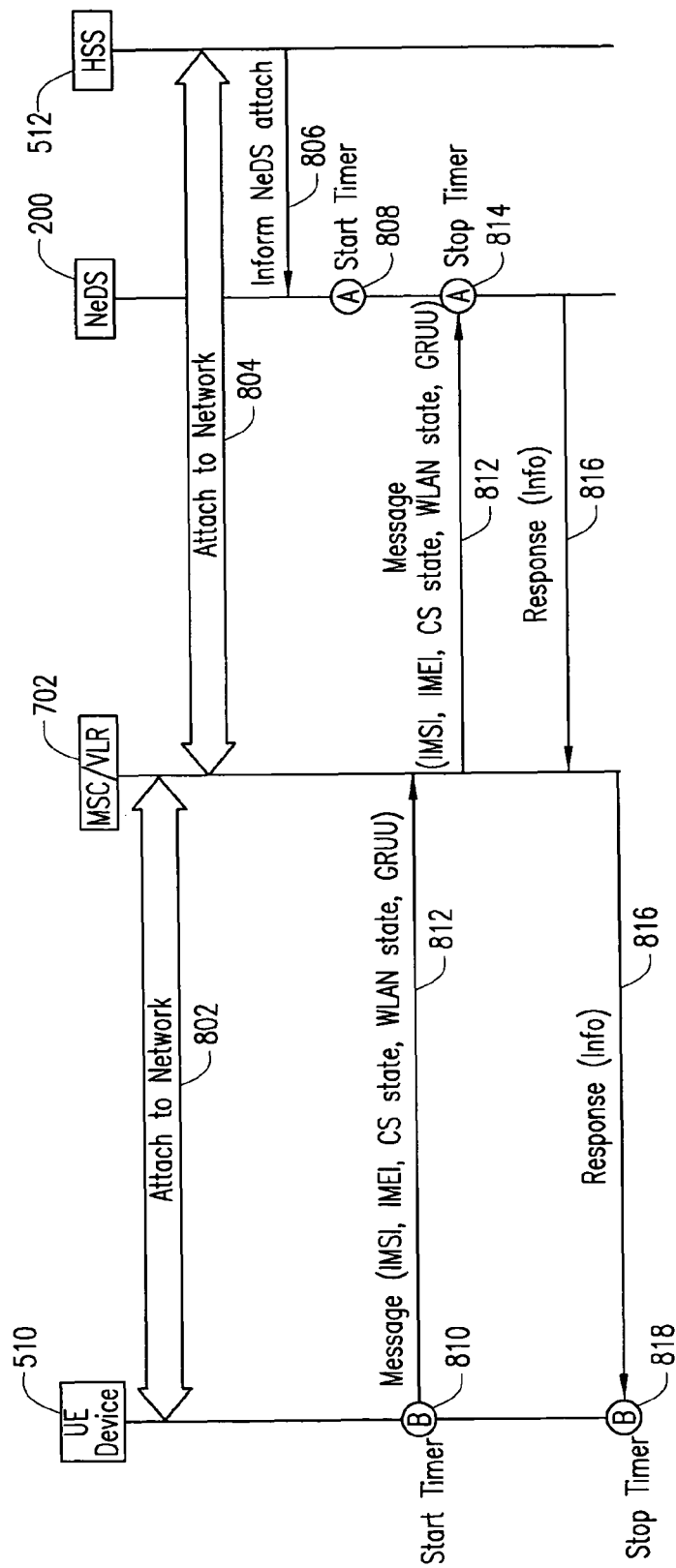
FIG. 8 depicts a message flow diagram relating to initial registration with a NeDS element in one embodiment.

FIG. 8 depicts a message flow diagram relating to initial registration with a network node in one embodiment. As illustrated, when the UE device 510 attaches to a network using CS signaling, HSS 512 is operable to inform the serving network node 200 of the attached status of the UE device. Reference numeral 802 refers to applicable attach procedure messaging between UE 510 and MSC/VLR 702. Likewise, reference numeral 804 refers to attach procedure messaging between MSC/VLR 702 and HSS 512. As alluded to previously, the MSC/VLR is essentially a network node responsible for session control and/or switching media such as voice. HSS 512 is essentially a database function that contains but not limited to information about services to which a subscriber has subscribed, user configuration of the subscribed services, user policies, operator policies, and how the various network elements to are supposed to behave when the policies or policy combinations are applied.

Upon the attach procedure 804, HSS 512 generates a notification message 806 towards NeDS 200 to inform the UE's attached status. Upon receipt of the notification 806, a timer may be started (block 808) that is maintained until a registration message 812 is received from the UE device 510. Upon receipt of the registration message 812 at NeDS 200, the timer is stopped (block 814), indicating that the UE device is IMS service-capable. A timer mechanism (block 810) may be started on the UE device as well when the registration message 812 is generated, so that validity of a registration response message 816 from NeDS 200 may be ensured. Upon receipt of the response message 816, the UE's timer may be stopped (block 818).

Figure 9:
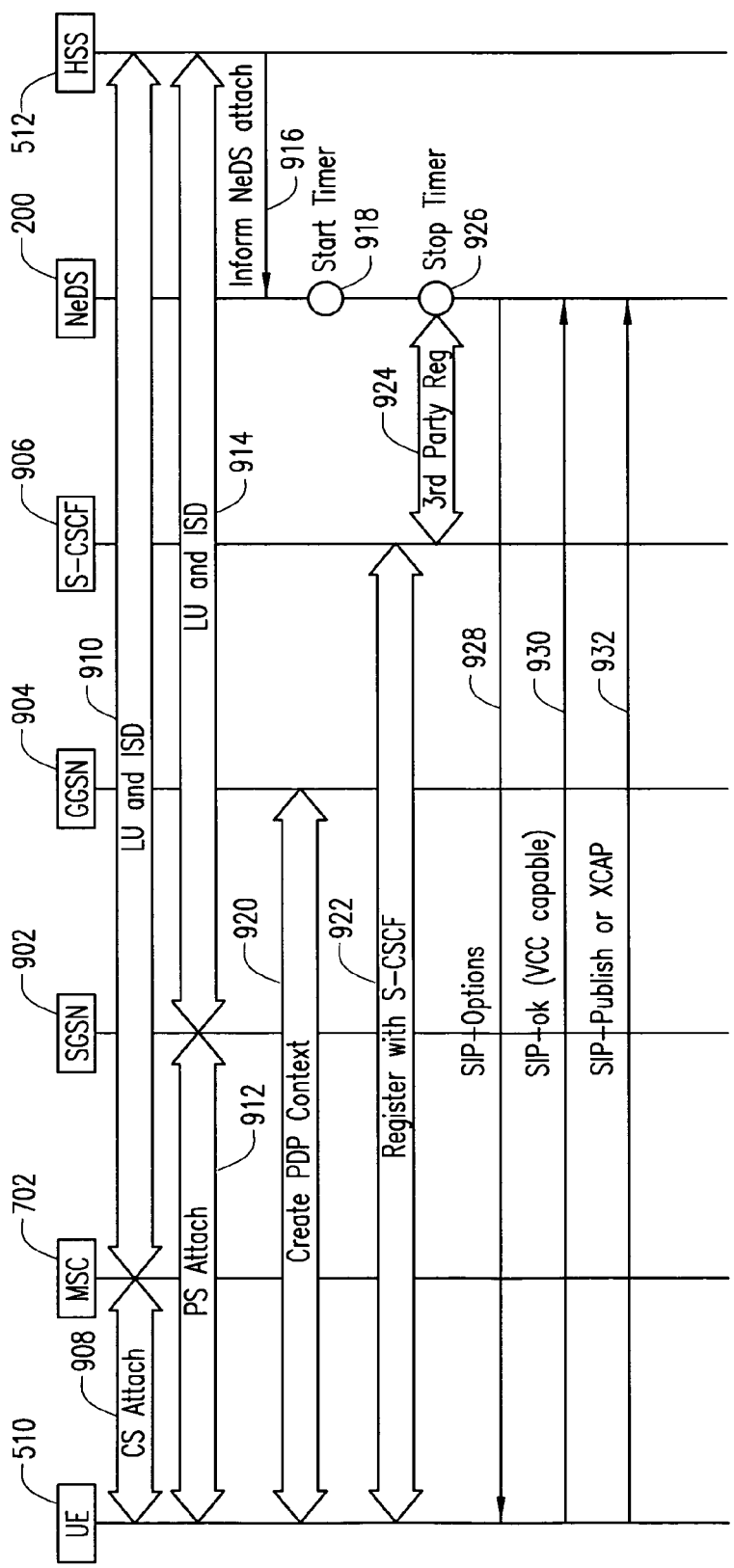
FIG. 9 depicts a message flow diagram relating to initial registration with a NeDS element in another embodiment.

FIG. 9 depicts a message flow diagram relating to initial registration with a network node in another embodiment wherein IMS signaling is used (e.g., via an IP-based network such as a GPRS network, LTE network, Wi-MAX or a WLAN). Upon UE device's attach procedure 908 with MSC 702 using CS signaling, appropriate Location Update (LU) and Insert Subscriber Data (ISD) procedures 910 take place between HSS 512 and MSC 702. Additionally, upon UE device's attach procedure 912 with an IP-based network, e.g., GPRS, a Serving GRPS Support Node (SGSN) 902 is operable to engage in applicable LU and/or ISD procedures 914 with HSS 512. Responsive thereto, a notification message 916 is generated to inform NeDS 200 of the attach status with respect to the UE device 510, whereupon a timer mechanism may be started (block 918). Upon creating a PDP context (reference numeral 920) with a Gateway GPRS Support Node (GGSN) 904, UE 510 registers with a Serving Call Session Control Function (S-CSCF) 906 via a registration message 922. In response, S-CSCF 906 engages in a $3^{rd}$ party registration procedure 924 with NeDS 200, whereupon the timer mechanism may be stopped (block 926). As a further implementation, after registration has taken place with the IMS network, the NeDS node 200 may send a SIP Options request 928 to the UE device 510 requesting its capabilities (e.g., IMS service capabilities, in particular). In response, UE 510 generates a SIP OK message 930 which may include appropriate indications with respect to the requested capabilities. Thereafter, a SIP Publish message or XCAP message 932 may be provided by the UE device 510 to NeDS 200, which contains appropriate configuration information (e.g., policy information, updates, actions to be taken, et cetera).

Figure 10:
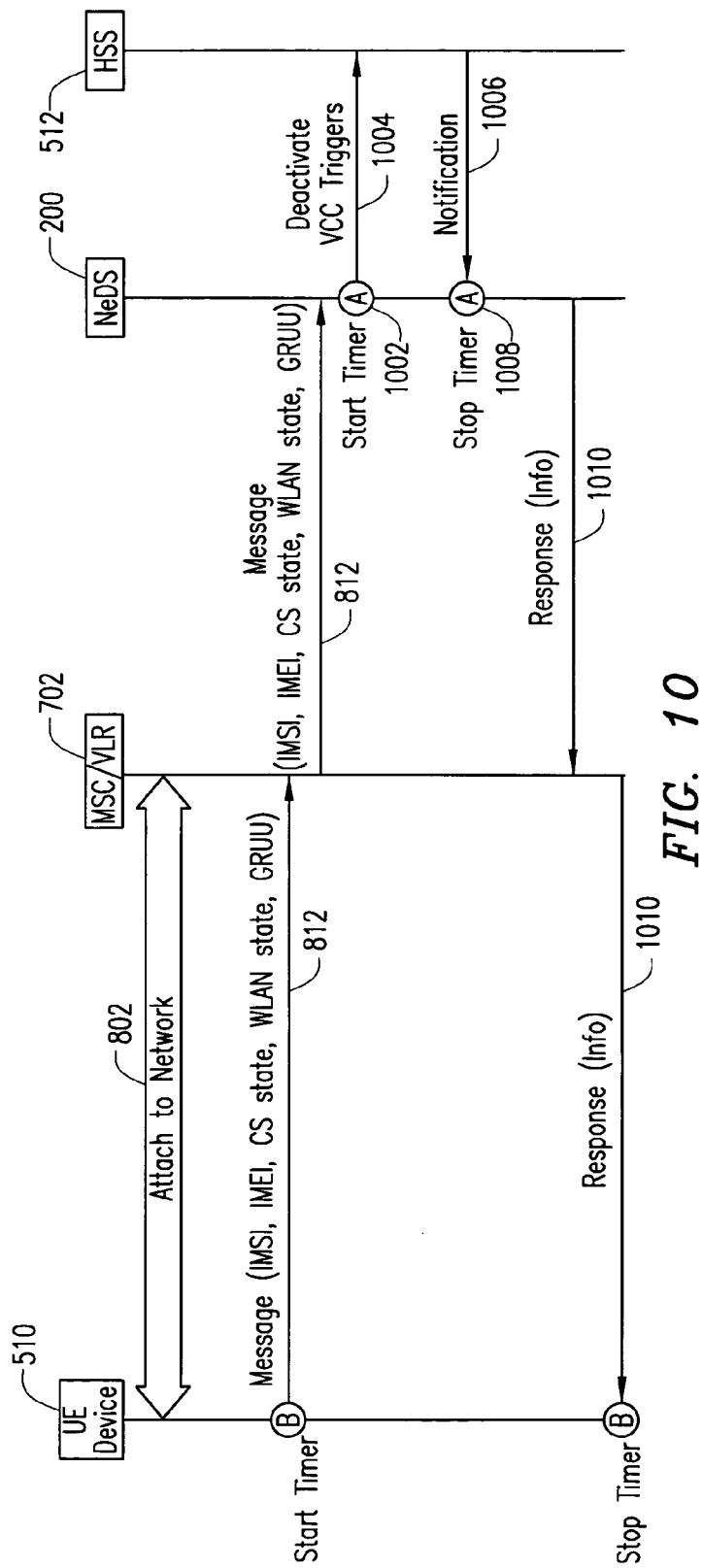
FIG. 10 depicts a message flow diagram relating to disabling triggers by a NeDS element in accordance with an embodiment.

In another implementation, the IMS node having the CCCF/NeDS functionality is operable to inform the HSS to disable the CAMEL triggers. FIG. 10 depicts a message flow diagram relating to disabling triggers by a NeDS element in accordance with an embodiment. As before, the UE device 510 attaches to MSC/VLR 702 using applicable attach procedure(s) 802. A timer mechanism may be started on the UE device 510 when message 812 is generated that is propagated via MSC/VLR infrastructure to NeDS 200. Upon receipt of message 812, a timer mechanism may be started (block 1002) at the NeDS node 200. Also, a deactivate message 1004 is generated by NeDS 200 towards HSS 512 indicating that CAMEL triggers relating to one or more select IMS services (e.g., VCC) be disabled. In response, a notification message 1006 is provided by HSS 512 to NeDS 200, whereupon the timer mechanism is stopped (block 1008). Appropriate response messaging 1010 is propagated back from NeDS 200 to the UE device 510.

Since it is required that the UE device and its information be ultimately registered with the NeDS functionality, the CCCF may be involved in communicating the necessary information to the NeDS associated therewith, particularly where the UE device is operable to register with the CCCF node only. As described above, registration with the NeDS can be effectuated via the IMS domain or via the CS domain. Also, the applicable registration processes preferably take place after the UE device is attached in either a CS network or in a PS network. By way of exemplary implementation, it may be specified that NeDS registration take place via IMS signaling first. However, if IMS signaling is not available (e.g., because of no GPRS or WLAN coverage), registration may proceed using CS signaling as described above.

Figure 11:
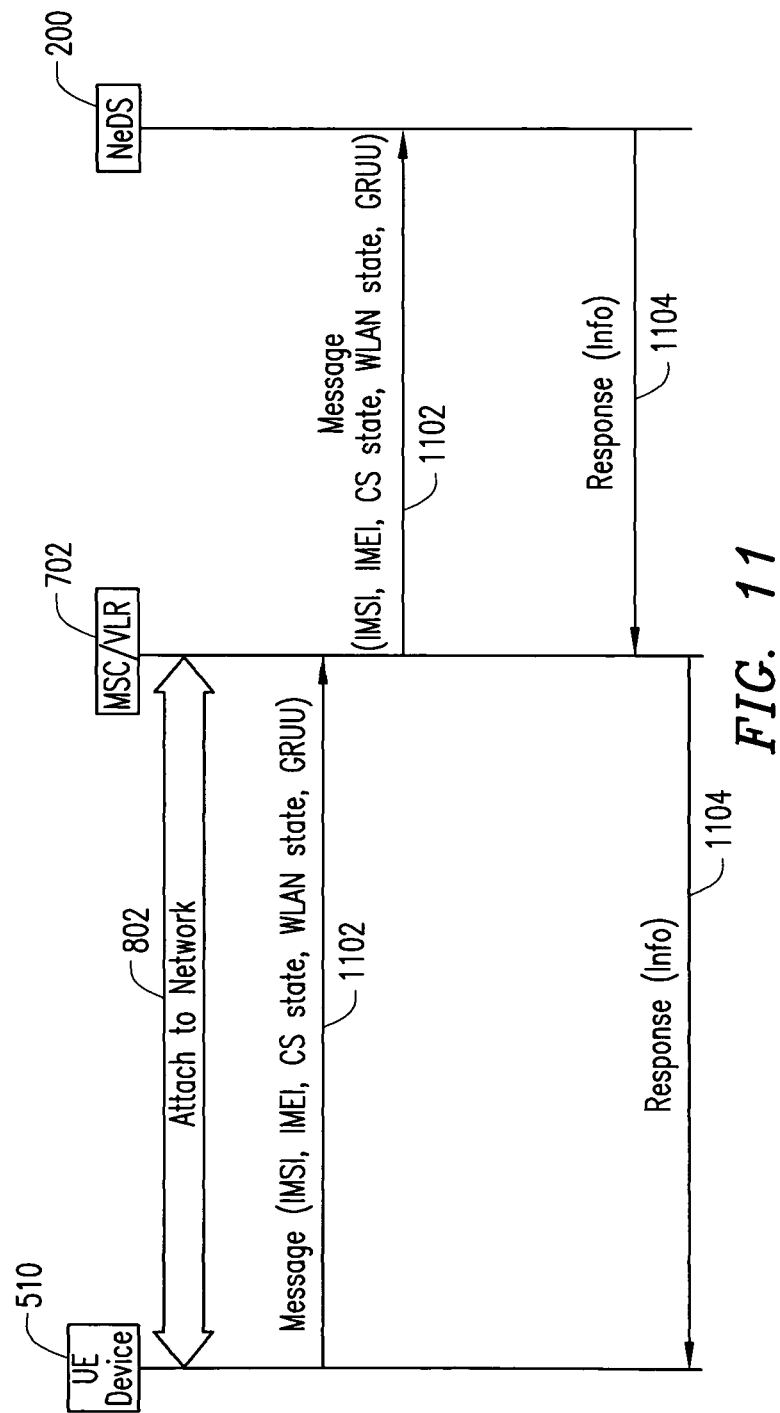
FIG. 11 depicts a message flow diagram relating to a generalized registration process with a NeDS element in one embodiment.

FIG. 11 depicts a message flow diagram relating to a generalized registration process with a network node in one embodiment without involving an HSS node. After attaching with a CS network via applicable attach procedures 802, UE 510 is operable to generate a registration message 1102 that is propagated via MSC/VLR infrastructure 702 to NeDS 200. The registration message 1102 may be implemented using, but not limited to, USSD messaging (described below in further detail) or Short Message Service (SMS) messaging. Suitable response messaging 1104 is provided by NeDS to UE 510. By way of exemplary implementation, the registration message 1102 effectuated in the CS domain may contain one or more of the following information elements: GRUU; GRUU supported; subscriber identity (e.g., IMSI); equipment identity or Instance Identifier (e.g., IMEI/IMEISV, PIN, ESN, etc.); subscriber location (e.g., GPS information, CGI information relating to the registered networks, user input waypoint such as airport code, city, point of interest or landmark data, postal code, and the like); network ID information relating to the available networks (e.g., CGI information relating to wide area cellular networks, Service Set Identifier (SSID) information relating to WLANs, Wi-MAX networks, etc.); location update timer information; PS attach status (i.e., attached or detached); routing update timer information; PDP context status (i.e., attached or detached); IP network status, e.g., WLAN status (associated, local IP address assigned, PDF contacted, etc.); and subscriber preferences/policies.

As explained previously, GRUU may be comprised of an IMSI and IMEI combination and is operable to indicate a unique instance ID (e.g., IMEI) and the Address of Record (e.g., SIP URI). Location data may be used to determine if an IMS service (e.g., VCC) should be invoked or disabled (e.g., in a country or region where VCC is not supported). Additionally, location data may also be used to determine if the UE device is currently registered on a IMS service-capable network. Network ID information may be used to support the capability of redirection. In other words, the UE device may be redirected to a different cellular network or WLAN by the IMS network node based on the available networks and their capabilities as well as any service requirements specified by the UE device. The location update timer information may be used by the NeDS functionality to coordinate updating of information between the UE device and NeDS. The routing update timer information may be used by the NeDS functionality to determine how often it will periodically check in with the PS network in order to verify whether the routing update timer has been reset or not.

The behavior of the UE device 510 with respect to registration via CS signaling can be summarized as follows. Upon sending the registration message, the UE device may start a timer (either hard-coded or set in the UE (e.g., either in a removable module such as those described previously or a memory integrated within the UE, either of which may be OTA-configurable) so as to set a time window within which a response may be expected from the NeDS function. If no response is received, the UE device may be configured to attempt the registration process a select number of times (e.g., five attempts), after which it may be deemed that the communication path has failed and/or the IMS service is not available. If the response message is received within the time window or upon a valid retry, the UE device is operable to stop the timer mechanism. If the response message includes an indication that VCC shall not be performed, the UE device may not perform any handovers from IMS to CS and vice versa. As a result, the UE device may not perform any signaling for VCC. If the UE device receives a GRUU via the response message, the received GRUU may be stored locally either in the UE's memory or in a removable module coupled thereto. Optionally, a NeDS update timer may be provided in the response message to the UE device, which may also be stored locally, preferably writing over any default value. In a further variation, the UE device may receive one or more PLMN codes for the networks which it is not currently registered on. If such codes are included, the UE device may perform a scan in applicable bands and technologies to discover the network(s). Thereafter, upon discovery, the UE device may perform attach procedures with respect to the discovered network and may repeat the registration and post-registration processes. Alternatively, if no networks are discovered, the received PLMN code(s) may be disregarded.

Similarly, the registration behavior of the UE device 510 via IMS signaling can be summarized as follows. Once the UE device has been successfully authenticated with a CS network or a PS network, it may then register with the NeDS node over applicable packet data infrastructure such as, e.g., GPRS, via SIP messaging (e.g., SIP Notify or SIP Publish) or XCAP messaging, as described previously. Regardless of the actual messaging protocol utilized, the registration message preferably includes a number of information elements similar to the information elements described above with respect to registration via CS signaling. Furthermore, various timer mechanisms and post-registration processes may also be activated by the UE upon registration via IMS signaling, much like the processes set forth above with respect to UE's behavior in CS-based registration.

Figure 12:
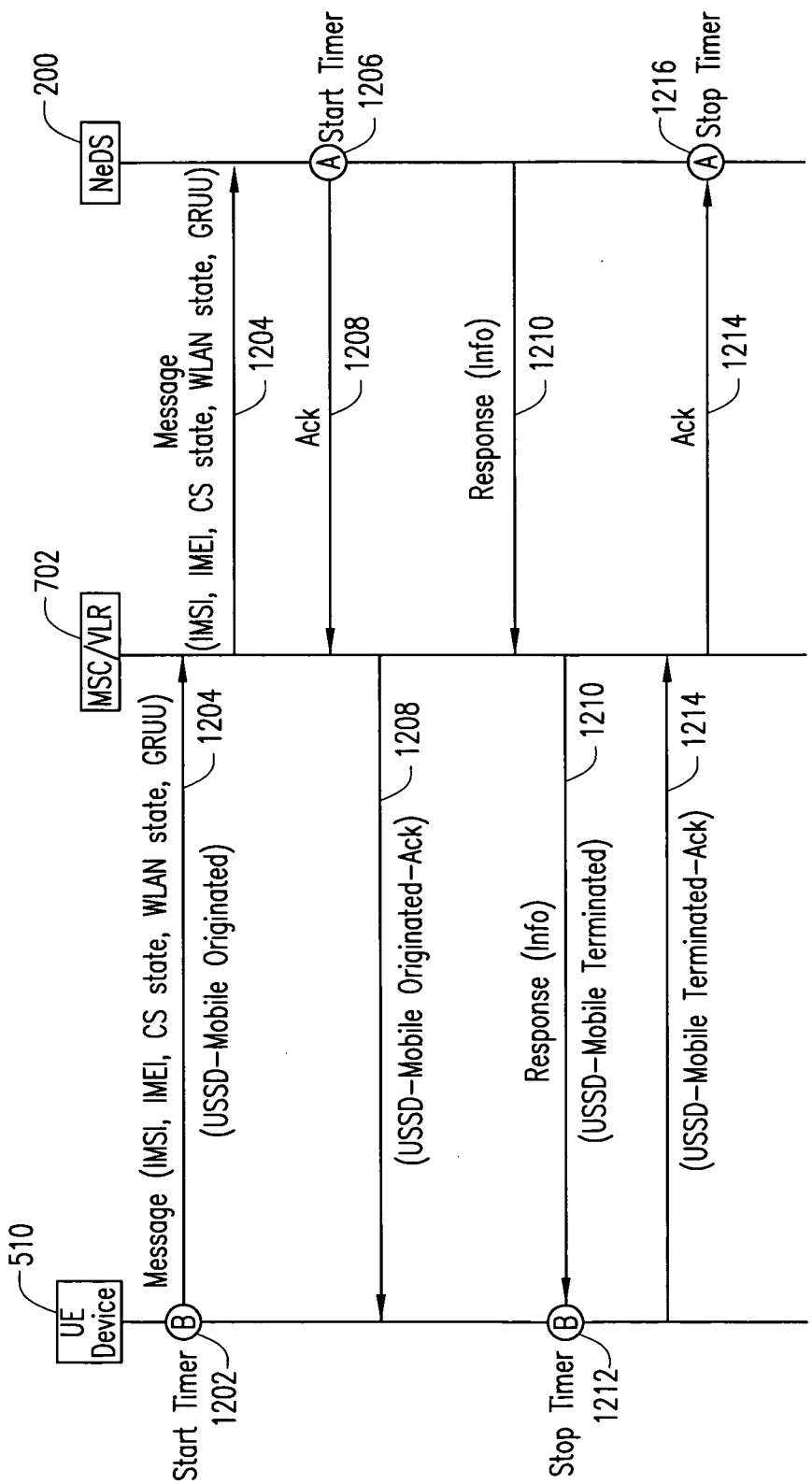
FIGS. 12 and 13 depict message flow diagrams relating to a generalized registration process with a NeDS element using Unstructured Supplementary Service Data (USSD) messaging.
Figure 13:
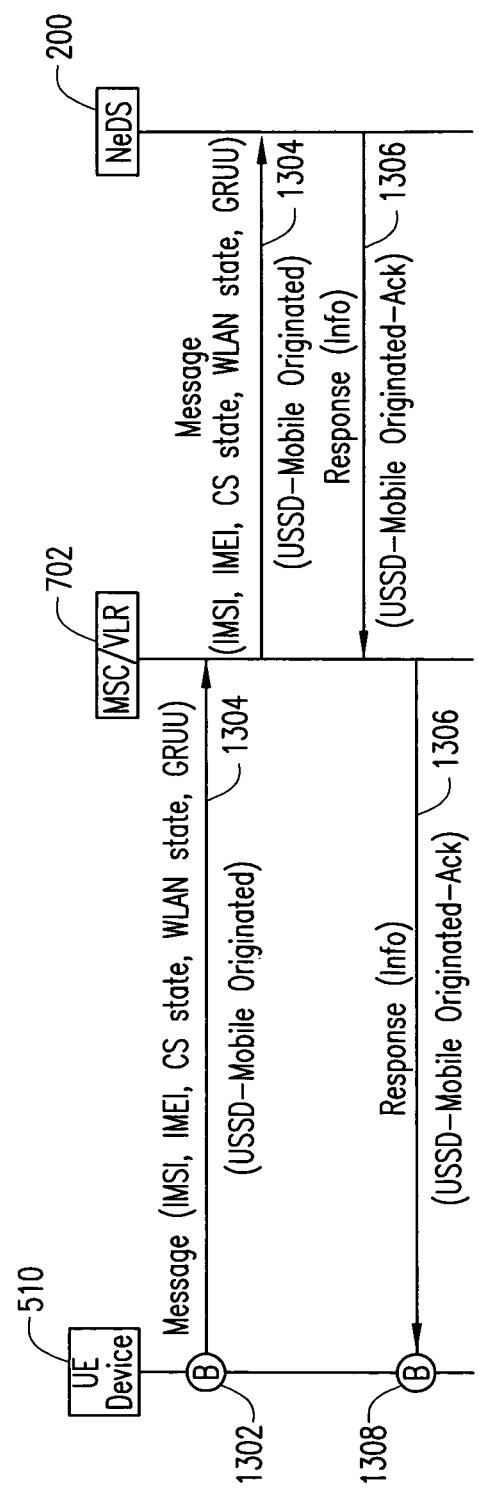

By way of illustration, FIGS. 12 and 13 depict message flow diagrams relating to a generalized CS-based registration process with a NeDS element using USSD messaging. A mobile originated USSD (MO-USSD) registration message 1204 is generated by the UE device 510 for propagation to NeDS 200 via MSC/VLR infrastructure 702. An acknowledgment message (MO-USSD-Ack) 1208 is returned by NeDS 200 in response. Thereafter, another message, mobile terminated USSD (MT-USSD) response 1210 is provided by the NeDS function 200 to the UE device 510 that contains appropriate information. An acknowledgment message (MT-USSD-Ack) 1214 is generated by the UE device in response thereto. Reference numerals 1202/1212 and 1206/1216 refer to the timer processes on the device side and NeDS side, respectively, as described above in detail. The message flow embodiment shown in FIG. 13 is essentially similar to the message flow embodiment shown in FIG. 12, except that no separate USSD acknowledgement messages are used. Accordingly, reference numerals 1304 and 1306 refer to MO-USSD registration and response messages, respectively, wherein the response message 1306 includes both acknowledgement as well as the requisite information. Reference numerals 1302 and 1308 likewise refer to the timer processes on the device side as described above.

Figure 14:
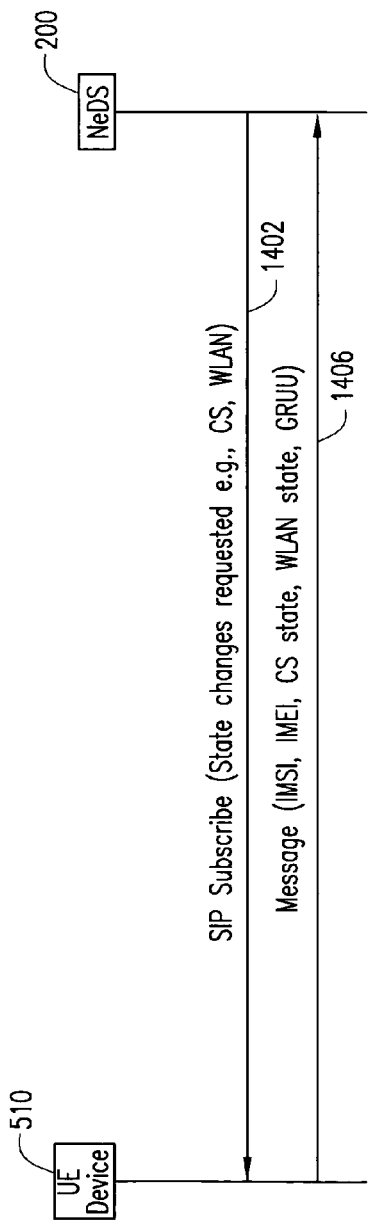
FIG. 14 depicts a message flow diagram relating to messaging between a UE device and associated NeDS element with respect to the UE device's state change in one embodiment.

Subsequent to registration, the UE device may provide updated status information to the NeDS element based on one or more of the following conditions: (i) on expiry of NeDS location update timer; (ii) change in CS domain status; and (iii) change in IP domain status (e.g., status with respect to the WLAN). In one implementation, the transmission of the updated information may be controlled via presence-based messaging that uses the NeDS/UE device interfaces described previously. For example, the NeDS function may subscribe to the UE's user agent such that upon detecting any change in the CS status, IMS status, timer events, etc., appropriate notifications may be provided to the NeDS. FIG. 14 depicts a message flow diagram relating to messaging between a UE device and associated NeDS element with respect to the UE device's state change in one embodiment. A SIP Subscribe message 1402 generated by NeDS 200 towards the UE device 510 includes various requested state changes. A response message 1406 from the UE device includes appropriate status updates as per the request. Alternatively, when the UE device 510 is registered with NeDS 200, a flag may be returned in the USSD/SMS or SIP response message, indicating that such presence information is required.

Where periodic notification is implemented (e.g., based on expiry of a NeDS timer), either CS signaling or IMS signaling may be used. When the NeDS timer expires, the UE is operable to send an update message that includes status changes with respect to any of the information elements described previously, e.g., GRUU; subscriber identity; equipment identity; subscriber location (e.g., GPS information, CGI information relating to the registered networks, etc.); network ID information (e.g., CGIs and/or SSIDs); location update timer information; PS attach status; routing update timer information; PDP context status; WLAN status; and subscriber preferences/policies. A separate timer mechanism may be implemented by the UE device with respect to the update messaging process. Upon transmitting an update message, a timer may be started to identify a response window. If no response or acknowledgment is received back from the NeDS function within the response window (i.e., the timer times out), the UE may attempt retransmitting the update message a select number of times (e.g., a maximum of five times) before the update message is deemed to have failed.

If the UE device loses CS coverage and the NeDS function can be reached via another radio access technology (e.g., WLAN, Wi-MAC, LTE, etc.), the UE device includes logic to inform the NeDS that CS coverage has been lost via a "CS coverage loss" message. In addition, the following information elements may be included but not limited to in the CS coverage loss message: GRUU; subscriber identity (Public User ID and/or Private User ID; terminal identity (MAC address, IMEI/IMEISV, PIN, ESN, etc.); subscriber location; network ID information (e.g., SSIDs and/or CGIs); and CS detach status. It should be appreciated that this CS coverage loss message may be implemented using SIP Notify or SIP Publish messages. Furthermore, this procedure can take place while there is an ongoing call in the WLAN domain.

Figure 15:
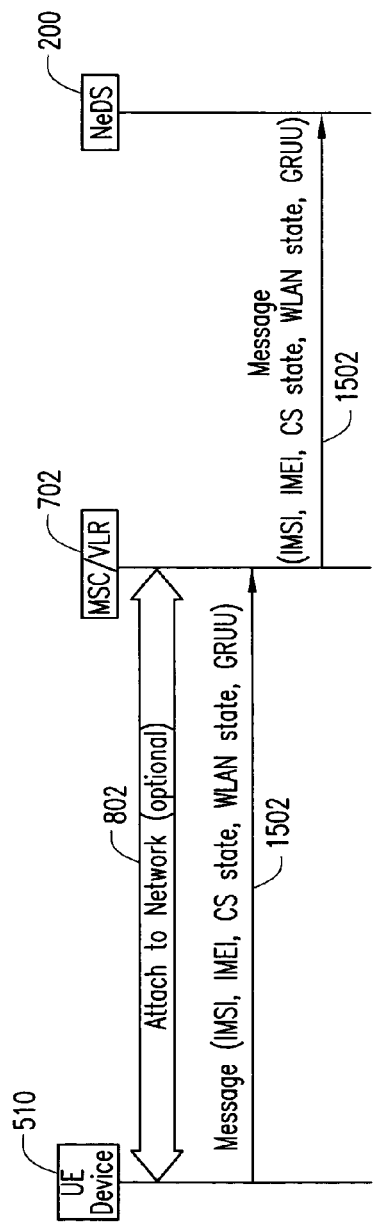
FIG. 15 depicts a message flow diagram relating to messaging between a UE device and associated NeDS element with respect to discovering a circuit-switched (CS) domain by UE device.

If the UE device finds CS coverage again, the UE device includes logic to inform the NeDS function accordingly. FIG. 15 depicts a message flow diagram relating to messaging between UE 510 and associated NeDS element 200 with respect to discovering a CS domain by UE 510. As illustrated (reference numeral 802), attaching on the newly found CS network may be optional. An update message 1502 provided by the UE device 510 that includes the following information elements: GRUU; subscriber identity; terminal identity; subscriber location; network ID information (e.g., SSIDs and/or CGIs); CS attach status; and WLAN/IMS status.

Figure 16:
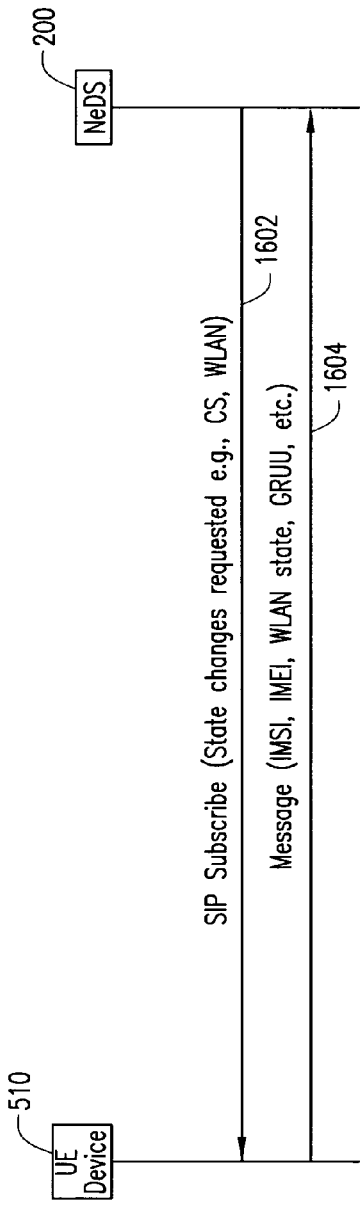
FIG. 16 depicts a message flow diagram relating to messaging between a UE device and associated NeDS element with respect to the UE device's state change in another embodiment.
Figure 17:
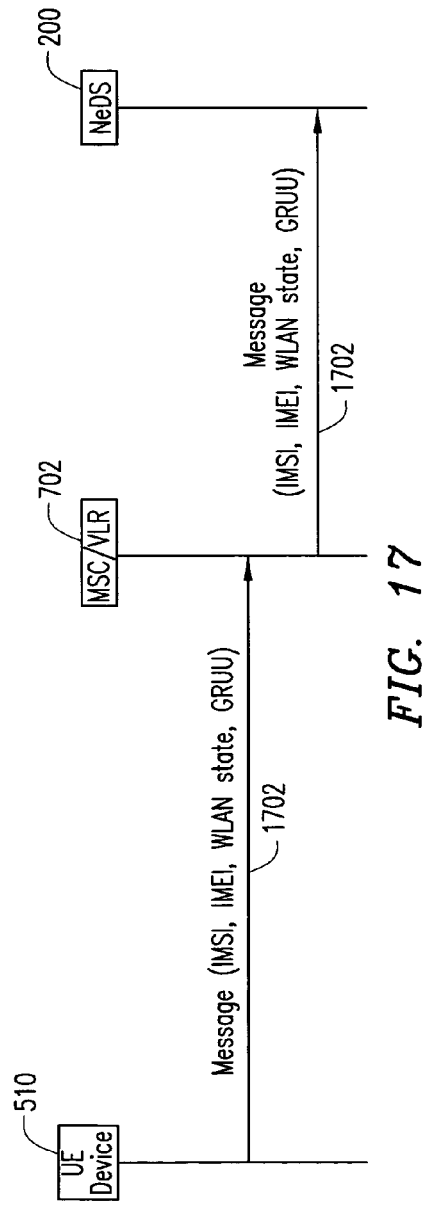
FIG. 17 depicts a message flow diagram relating to messaging between a UE device and associated NeDS element with respect to the UE device's state change in a still further embodiment.

Similar to controlling the transmission of CS domain status change via presence-based messaging, WLAN/IMS status changes may also be notified to the NeDS function via presence-enabled procedures as illustrated in FIG. 16. Reference numeral 1602 refers to a SIP Subscribe message that allows the NeDS function 200 to receive WLAN/IMS status changes as they occur via a response message (e.g., SIP Notify) 1604 generated by the UE device. Furthermore, in a separate embodiment, the UE device may also include logic to provide WLAN/IMS status changes via CS signaling as illustrated in FIG. 17, wherein reference numeral 1702 refers to an update message (e.g., using USSD, etc.) which includes appropriate updates to the WLAN/IMS domain. Moreover, regardless of whether SIP messaging is used (i.e., Notify or Publish) or USSD messaging is used, additional information elements may be included in the update message: GRUU; subscriber identity; terminal identity; subscriber location; network ID information (e.g., SSIDs and/or CGIs); and WLAN/IMS status.

Figure 18:
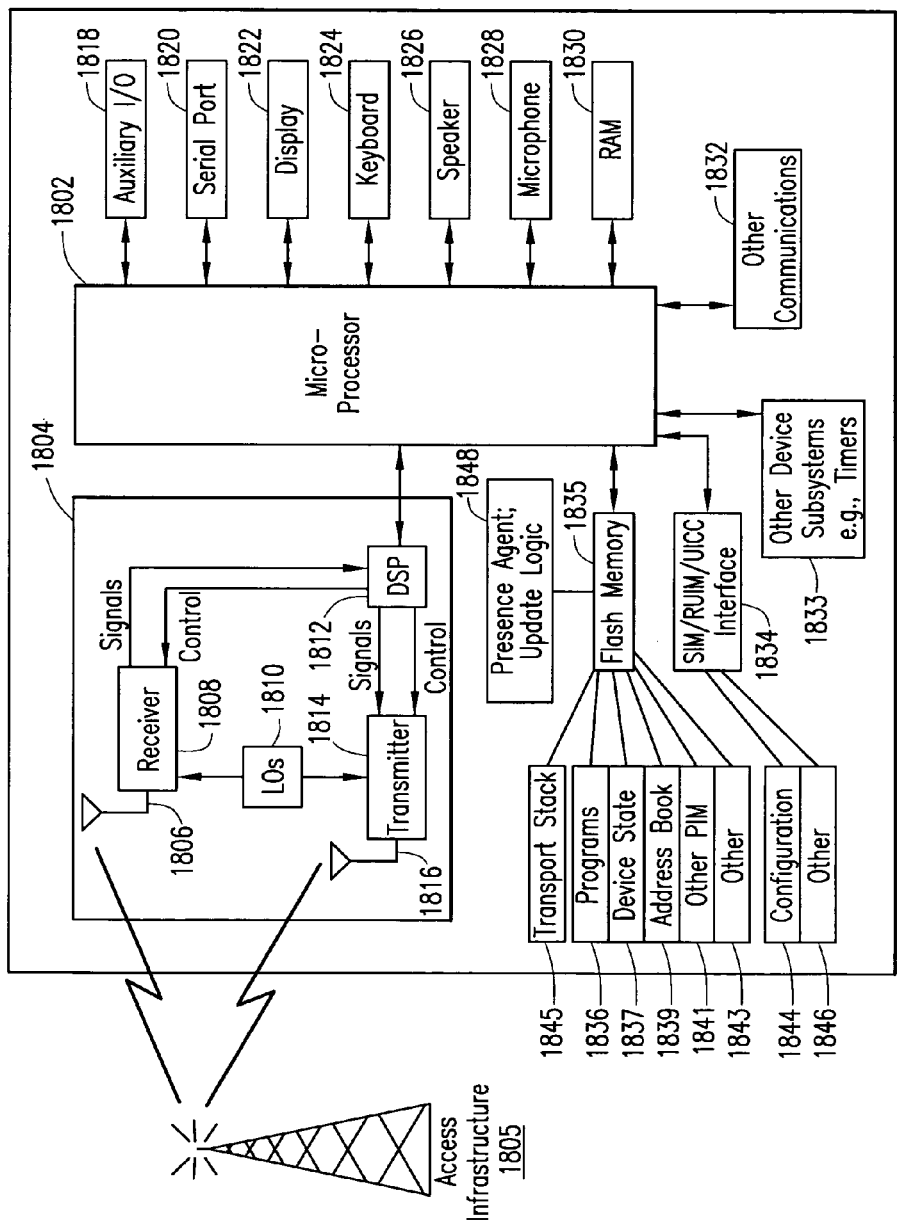
FIG. 18 depicts a block diagram of an embodiment of a communications device operable for purposes of the present patent disclosure.

FIG. 18 depicts a block diagram of an embodiment of a communications device operable as a wireless UE device, e.g., UE 510, having dual-domain capability (i.e., CS domain and IMS domain) for purposes of the present patent disclosure. It will be recognized by those skilled in the art upon reference hereto that although an embodiment of UE 510 may comprise an arrangement similar to one shown in FIG. 18, there can be a number of variations and modifications, in hardware, software or firmware, with respect to the various modules depicted. Furthermore, a UE device may be treated as a combination of a mobile equipment (ME) device and a removable storage module having the various pieces of information described in detail hereinabove. Accordingly, the arrangement of FIG. 18 should be taken as illustrative rather than limiting with respect to the embodiments of the present patent disclosure. A microprocessor 1802 providing for the overall control of an embodiment of UE 510 is operably coupled to a communication subsystem 1804 that is capable of multi-mode communications (e.g., CS domain, IP domain such as IMS/WLAN/Wi-MAX, et cetera). The communication subsystem 1804 generally includes one or more receivers 1808 and one or more transmitters 1814 as well as associated components such as one or more local oscillator (LO) modules 1810 and a processing module such as a digital signal processor (DSP) 1812. As will be apparent to those skilled in the field of communications, the particular design of the communication module 1804 may be dependent upon the communications networks with which the mobile device is intended to operate (e.g., a CDMA network, a GSM network, WLAN, et cetera). Regardless of the particular design, however, signals received by antenna 1806 through appropriate access infrastructure 1805 (e.g., cellular base station towers, WLAN hot spots, etc.) are provided to receiver 1808, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 1812, and provided to transmitter 1814 for digital-to-analog (D/A) conversion, frequency up conversion, filtering, amplification and transmission over the air-radio interface via antenna 1816.

Microprocessor 1802 may also interface with further device subsystems such as auxiliary input/output (I/O) 1818, serial port 1820, display 1822, keyboard/keypad 1824, speaker 1826, microphone 1828, random access memory (RAM) 1830, a short-range communications subsystem 1832, and any other device subsystems, e.g., timer mechanisms described above, generally labeled as reference numeral 1833. To control access and provide storage of data, a Subscriber Identity Module (SIM) or Removable User Identity Module (RUIM) or a UICC interface 1834 may also be provided in communication with the microprocessor 1802. In one implementation, SIM/RUIM/UICC interface 1834 is operable with a SIM/RUIM/UICC card having a number of key configurations 1844 and other information 1846 such as identification and subscriber-related data such as user policies/preferences, timer periods, etc.

Operating system software and applicable service logic software may be embodied in a persistent storage module (i.e., non-volatile storage) such as Flash memory 1835. In one implementation, Flash memory 1835 may be segregated into different areas, e.g., storage area for computer programs 1836 (e.g., service processing logic), as well as data storage regions such as device state 1837, address book 1839, other personal information manager (PIM) data 1841, and other data storage areas generally labeled as reference numeral 1843. A transport stack 1845 may be provided to effectuate one or more appropriate radio-packet transport protocols. In addition, a presence agent, update logic module 1848 is provided for effectuating the UE device functionality as set forth in detail hereinabove. Essentially, the logic module 1848 is operable in conjunction with other structures to facilitate the following: (i) registration with the NeDS (CS or IMS); (ii) informing the NeDS of the domains the UE device is currently registered; (iii) identifying the state of the UE device in the registered domains; (iv) identifying location information pertaining to the UE device (to facilitate whether IMS services should be performed); and (v) providing status updates to the NeDS based on presence and/or timer mechanisms.

Based on the foregoing detailed description, NeDS behavior upon receiving registration messaging, initial location updates, and subsequent update information will now be set forth in additional detail. With respect to registration via CS signaling, the NeDS function is operable to examine the contents of the message string and determine whether a GRUU was included or not. If no GRUU was received, the NeDS function is operable to generate a GRUU using the subscriber ID and equipment ID. The constructed GRUU is operable as an indexer to store the received information at the NeDS function. The resultant GRUU record may be marked to be in one of the states as identified in FIG. 6A. For purposes of initial registration, the valid states can be: (i) CS Attached/Idle (state 618) or (ii) CS Attached/Idle and IMS Registered/Idle (state 604). On the other hand, if a GRUU has been obtained from the UE device, the NeDS function is operable to determine if a record already exists for the received GRUU. If so, the GRUU record is updated based on the information provided. If no record exists, a new GRUU record is created based on the received GRUU and associated information.

Alternatively, if GRUU capability is not supported by the UE device, the NeDS is operable to generate a record based on a Private User Identity (PUI), which can be an IMSI, MIN, PIN, etc. In this case, the PUI/IMSI may be used for indexing the records in the NeDS. Furthermore, as alluded to previously, the NeDS functionality may include logic to examine the location of the UE device and determine whether an IMS service (e.g., VCC) should be provided. In a related implementation, if the IMS service should not take place, the NeDS function includes logic to inform the HSS element to deactivate any CAMEL triggers in the HSS if CAMEL has been deployed (e.g., as shown in FIG. 10). Relatedly, the NeDS function may also inform the UE device that the IMS service will not be performed (e.g., by providing or setting an IMS service flag in the response message to the UE device). If the IMS service is to be performed, on the other hand, the NeDS function is operable to examine the location of the UE to determine if the UE is in a network that supports the requested IMS service. If the network does not support the IMS service, the NeDS function may inform the UE device to switch to another network that supports the IMS service. As alluded to before, one or more PLMN codes may be provided to the UE device that are identified as being capable of supporting the IMS service (i.e., network redirection). By way of implementation, the NeDS function may consult an internal or external database using the network ID data provided by the UE device to determine which network supports the IMS service.

Additionally, the NeDS function may also include the capability to inform the UE device via a suitable message how often it needs to be notified that the UE device is available in the CS domain, which notification may be implemented by providing a CS location update timer in the UE's response. The NeDS function may initialize its update timer upon sending this message to the UE device. As a default implementation, the NeDS location update timer may be the same as the CS location update timer. Further, the NeDS function may preferably include the capability to request presence information from a presence server using defined protocols via appropriate interfaces as described previously. Moreover, the NeDS function may also inform the UE device if any presence information is required, such as, e.g., CS or WLAN being lost, etc., by way of appropriate flags within a response/request message structure.

With respect to IMS registration, substantially similar behavior may be engineered into the NeDS functionality as well. As explained previously, the NeDS function may also include the capability to send a SIP Options message to the UE device (shown in FIG. 9). If the response from the UE device is that it is not capable of supporting an IMS service, two exemplary implementations may be provided. In one implementation, the NeDS element may inform the HSS node to deactivate any CAMEL triggers, similar to the CS registration behavior described above. Alternatively, the NeDS element may make a note that for this particular subscriber/UE combination, the IMS service is not available. Thus, for mobile originated calls when an Initial DP is received from the MSC, the called party number may be returned back to the MSC as the number to use for the outgoing call. Further, if USSD messaging is used, the original called party number may be returned back as the number to be used in the setup.

Upon receiving the SIP Publish or XCAP messaging as part of the IMS registration procedure, the NeDS function is operable to examine the contents therein and construct appropriate record(s) in the NeDS based on whether a GRUU has been provided or not, much like the CS registration behavior described above. Also, the NeDS may determine whether an IMS service should be provided based on the location information using internal/external databases, and based on such determinations, the NeDS may deactivate appropriate CAMEL triggers in the HSS to the extent CAMEL is deployed. Similar to the CS registration behavior, redirection to other networks may be possible in this case as well.

With respect to initial location updates, the NeDS function is operable to receive from the HSS or a presentity presence proxy server an indication that a PS attach and associated location update has taken place. Responsive thereto, the NeDS function is operable to start a timer to expect a registration from the UE using either USSD (on the CS side) or $3^{rd}$ party registration (on the IMS side as exemplified in FIG. 9). If either of these two registration events takes place, the timer may be stopped. On the other hand, if the timer expires without a registration, the UE device may be deemed as not being IMS service-capable. Similar to the treatment provided with respect to the situation where the IMS service is not supported, when an Initial DP is received from the MSC for mobile originated calls, the called party number may be returned back to the MSC as the number to use for the outgoing call.

With respect to receipt of periodic updates from the UE device, the NeDS function is operable to examine the contents of applicable update messages (e.g., via USSD or SMS in the CS domain, or via SIP Publish in the IMS domain) and update its subscriber/UE records and/or states accordingly. Preferably, the NeDS is operable to correlate the internal records by means of GRUU indexing or PUI indexing as described previously. Upon receipt of a CS status change, the NeDS function is operable to update the state model information associated with that particular GRUU or PUI/IMSI. Based on the state transition model set forth in FIG. 6A, if the CS status is "detached," the only valid states can be IMS Registered/Idle (state 608) or IMS Registered/Active (state 610). Likewise, if the CS status is "attached," the valid states can be CS Attached/Idle (state 618), CS Attached/Idle and IMS Registered/Idle (state 604), or CS Attached/Idle and IMS Registered/Active (state 606).

Similarly, if the NeDS function receives an IMS/WLAN status change, the state engine associated therewith is operable to update applicable state model information accordingly based on the GRUU or PUI/IMSI. If the IMS status is "local IP assigned" or "associated," the valid states can be CS Attached/Idle (state 618) or CS Attached/Active (state 616). If the IMS status is "PDF contacted," the valid states can be IMS Registered/Idle (state 608), CS Attached/Idle and IMS Registered/Idle (state 604), or CS Attached/Active and IMS Registered/Idle (state 612).

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method, practiced by a Network Domain Selection (NeDS) network entity in an Internet Protocol (IP) multimedia subsystem (IMS), of routing an incoming call, comprising:
   receiving a message from a Home Subscriber Server (HSS), the message being a notification message generated to inform the NeDS network entity, wherein the message indicates that a User Equipment (UE) has attached to a network;
   starting a timer upon receipt of the message, the timer having a pre-determined expiry period, wherein the NeDS network entity determines that the UE supports a given IMS service if a third party registration message is received before the timer reaches its predetermined expiry period; and
   on receiving the incoming call, consulting a database to determine a terminating network, wherein the terminating network supports the given IMS service if the NeDS network entity has determined that the UE supports the given IMS service.

2. The method of claim 1 further comprising terminating the incoming call to a domain based on the determinations, wherein the determinations are effectuated at a network node associated with an IMS network.

3. The method of claim 1 wherein the database is a wireless access network database.

4. The method of claim 1 wherein the database is located in a Global System for Mobile Communications (GSM) Home Subscriber Service (HSS).

5. The method of claim 1 wherein the database is located in the NeDS network entity.

6. The method of claim 1 wherein a database entry indicates at least one of the attach state of a U E and the PDP activation state of a UE and wherein the database entry is made based on operation of a presence user agent.

7. The method of claim 1 wherein the given IMS service is Voice Call Continuity (VCC).

8. The method of claim 1 further comprising informing the UE device to switch to another network that supports the given IMS service if a current network on which the UE device is registered does not support the given IMS service.

9. The method of claim 1 further comprising informing the UE device that the given IMS service will not be performed if no network is found that supports the given IMS service.

10. The method of claim 1 further comprising determining whether an IMS service is to be invoked with respect to the incoming call.

11. The method of claim 1 wherein the incoming call is terminated to a CS domain based on the determinations.

12. The method of claim 1 wherein the incoming call is terminated to an IMS domain based on the determinations.

13. The method of claim 1 further including determining where the UE device is located.

14. A Network Domain Selection (NeDS) network node in an Internet Protocol (IP) multimedia subsystem (IMS) network, comprising:
   an interface for communicating with a database;
   a component configured to receive a message from a Home Subscriber Server (HSS), the message being a notification message generated to inform the NeDS network entity, wherein the message indicates that a User Equipment (UE) has attached to a network;
   a component configured to start a timer upon receipt of the message, the timer having a pre-determined expiry period, wherein the NeDS network entity determines that the UE supports a given IMS service if a third party registration message is received before the timer reaches its predetermined expiry period; and
   a component configured, on receiving the incoming call, to consult a database to determine a terminating network, wherein the terminating network supports the given IMS service if the NeDS network entity has determined that the UE supports the given IMS service, the components comprising one of firmware and software stored in a non-transitory storage.

15. The network node of claim 14 further comprising a component configured to terminate the incoming call to a domain based on the determinations, wherein the determinations are effectuated at a network node associated with an IMS network.

16. The network node of claim 14 wherein the database is a wireless access network database.

17. The network node of claim 14 wherein the database is located in a Global System for Mobile Communications (GSM) Home Subscriber Service (HSS).

18. The network node of claim 14 wherein the database is located in the NeDS network entity.

19. The network node of claim 14 wherein a database entry indicates at least one of the attach state of a UE and the PDP activation state of a UE and wherein the database entry is made based on operation of a presence user agent.

20. The network node of claim 14 wherein the given IMS service is Voice Call Continuity (VCC).

21. The network node of claim 14 further comprising a component configured to inform the UE device to switch to another network that supports the IMS service if a current network on which the UE device is registered does not support the given IMS service.

22. The network node of claim 14 further comprising a component configured to inform the UE device that the given IMS service will not be performed if no network is found that supports the given IMS service.

* * * * *